(12) United States Patent
Steinberger et al.

(10) Patent No.: US 12,021,471 B2
(45) Date of Patent: Jun. 25, 2024

(54) APPARATUS FOR PROTECTING AND CONTROLLING AN ELECTRICAL LOAD

(71) Applicant: Future Systems Besitz GmbH, Rödental (DE)

(72) Inventors: Philipp Steinberger, Coburg (DE); Hubert Lenker, Sonneberg (DE); Peter Spiel, Regensburg (DE)

(73) Assignee: Future Systems Besitz GmbH, Rödental (DE)

( * ) Notice: Subject to any disclaimer, the term of this patent is extended or adjusted under 35 U.S.C. 154(b) by 486 days.

(21) Appl. No.: 17/432,287

(22) PCT Filed: Feb. 20, 2020

(86) PCT No.: PCT/EP2020/054565
§ 371 (c)(1),
(2) Date: Aug. 19, 2021

(87) PCT Pub. No.: WO2020/169780
PCT Pub. Date: Aug. 27, 2020

(65) Prior Publication Data
US 2022/0255308 A1    Aug. 11, 2022

(30) Foreign Application Priority Data

Feb. 22, 2019 (EP) .................................... 19158869

(51) Int. Cl.
*H02P 29/02* (2016.01)
*H02H 1/00* (2006.01)
(Continued)

(52) U.S. Cl.
CPC ......... *H02P 29/027* (2013.01); *H02H 1/0007* (2013.01); *H02H 3/05* (2013.01);
(Continued)

(58) Field of Classification Search
CPC .......... H02H 1/0007; H02H 3/08; H02H 3/05; H02H 3/093; H02H 7/12; H02H 7/222; H02P 29/027; H02P 23/14
See application file for complete search history.

(56) References Cited

U.S. PATENT DOCUMENTS 4,345,292 A    8/1982  Jaeschke et al.
5,642,247 A    6/1997  Giordano
(Continued)

FOREIGN PATENT DOCUMENTS

CN    103050944 B    4/2015
DE    42 42 560 A1   7/1993
(Continued)

OTHER PUBLICATIONS

International Search Report corresponding to PCT Application No. PCT/EP2020/054538, dated May 27, 2020 (17 bages).
(Continued)

*Primary Examiner* — Jue Zhang
*Assistant Examiner* — Lakaisha Jackson
(74) *Attorney, Agent, or Firm* — Maginot, Moore & Beck, LLP

(57) ABSTRACT

A load protection and control apparatus (1) for protecting and controlling an electrical load connected to the load protection and control apparatus (1) comprising an overcurrent protection circuit (1A) having a power switch (5) through which the electrical load receives an electrical load current ($I_L$) and having a sensor component (4) connected in series with the power switch (5) and adapted to generate directly a voltage drop ($\Delta U_4$) corresponding to the current rise speed of the electrical load current ($I_L$) flowing from an input terminal (2) of the load protection and control apparatus (1) via the sensor component (4) and the power switch (5) to the output terminal (3) and having a driver circuit (6)
(Continued)

adapted to detect an occurring overcurrent depending on the voltage drop ($\Delta U_4$) generated by the sensor component (4) and/or depending on a voltage drop ($\Delta U_5$) along the power switch (5) and adapted to switch off said power switch (5) upon detection of an overcurrent within a switch-off period of less than one millisecond; and/or comprising a power supply control circuit (10) having a sensor component (9) adapted to measure at the input terminal (2) a supply voltage (U) notified to a control unit (8) of the load protection and control apparatus (1) adapted to control an electrical power supplied to the electrical load, wherein each input terminal (2) is configured to establish an electrical connection with a busbar (14) of a busbar system or with a current carrying wire.

35 Claims, 19 Drawing Sheets

(51) Int. Cl.

| | | |
|---|---|---|
| *H02H 3/05* | (2006.01) | |
| *H02H 3/08* | (2006.01) | |
| *H02H 3/093* | (2006.01) | |
| *H02H 7/08* | (2006.01) | |
| *H02H 7/12* | (2006.01) | |
| *H02H 7/122* | (2006.01) | |
| *H02H 7/22* | (2006.01) | |
| *H02P 23/14* | (2006.01) | |
| *H02P 29/024* | (2016.01) | |

(52) U.S. Cl.
CPC .............. *H02H 3/08* (2013.01); *H02H 3/093* (2013.01); *H02H 7/08* (2013.01); *H02H 7/12* (2013.01); *H02H 7/1227* (2013.01); *H02H 7/222* (2013.01); *H02P 23/14* (2013.01)

(56) References Cited

U.S. PATENT DOCUMENTS

| | | |
|---|---|---|
| 2006/0203409 A1 | 9/2006 | Grisoni |
| 2009/0310270 A1 | 12/2009 | Burns et al. |
| 2012/0098517 A1* | 4/2012 | Esumi ................ H03K 17/0822 |
| | | 323/311 |
| 2012/0126859 A1* | 5/2012 | Kawamoto ............ H03K 3/012 |
| | | 327/108 |
| 2015/0092305 A1* | 4/2015 | Vaziri ...................... H02H 3/16 |
| | | 361/42 |
| 2016/0099559 A1* | 4/2016 | Fernandez-Guerrero ................... |
| | | H02H 1/0007 |
| | | 361/86 |
| 2017/0294774 A1 | 10/2017 | Illing et al. |

FOREIGN PATENT DOCUMENTS

| | | |
|---|---|---|
| DE | 197 29 599 C1 | 2/1999 |
| DE | 198 39 617 A1 | 3/2000 |
| DE | 10 2006 019 467 A1 | 10/2007 |
| DE | 11 2014 006 358 T5 | 10/2016 |
| DE | 10 2016 116 400 A1 | 3/2018 |
| EP | 0 473 428 A2 | 3/1992 |
| JP | 2000-215735 A | 8/2000 |
| KR | 10-1825062 B1 | 2/2018 |
| WO | 2017/068574 A1 | 4/2017 |
| WO | 2017127012 A1 | 7/2017 |

OTHER PUBLICATIONS

Extended European Search Report corresponding to European Patent Application No. 19 15 8869, dated Oct. 15, 2019 (19 pages).
Lim, S., "Small DFN Electronic Circuit Breaker Eliminates Sense Resistor," Linear Technology Magazine, May 2005, p. 25 (2 pages).

* cited by examiner

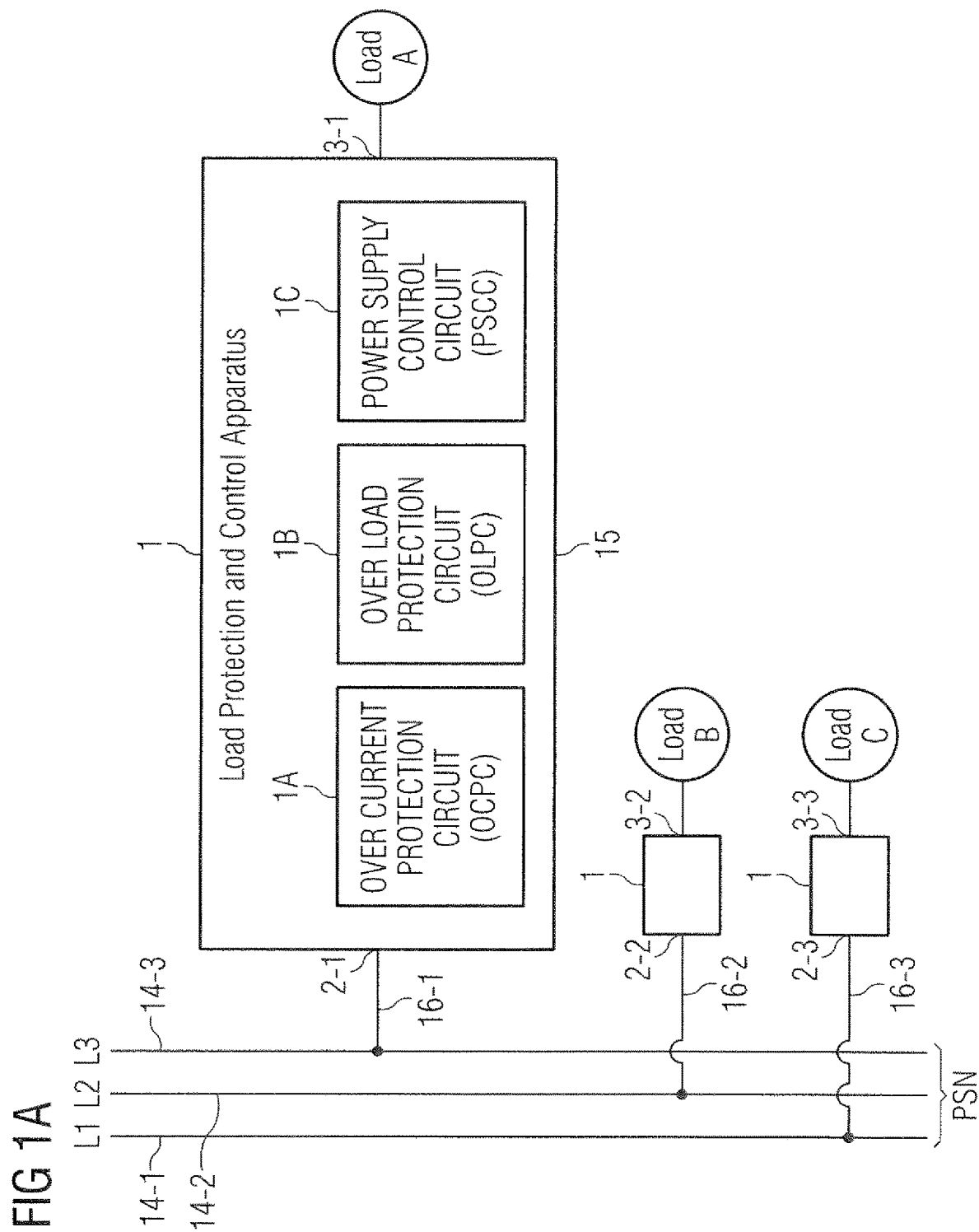

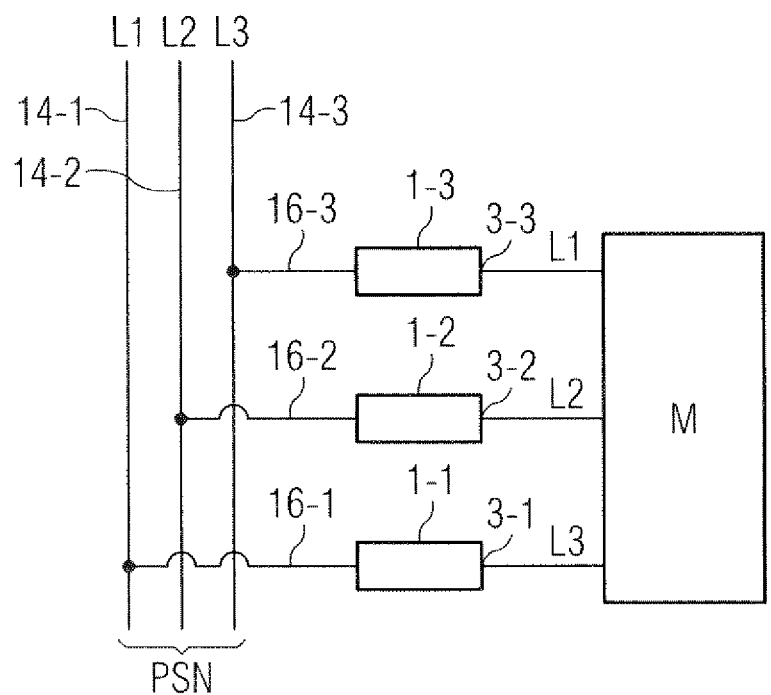

US 12,021,471 B2

APPARATUS FOR PROTECTING AND CONTROLLING AN ELECTRICAL LOAD

PRIORITY CLAIM

This application is a national stage application of PCT/EP2020/054565, filed on Feb. 20, 2020, which claims priority to European Patent Application 19158869.8, filed on Feb. 22, 2019, the entire disclosures of which are incorporated herein by reference.

TECHNICAL FIELD

The invention relates to a method and apparatus for controlling a power supply to an electrical load connected to the apparatus and protected by the apparatus against overcurrent and/or overload. The load can comprise an inductive load such as an electrical motor or capacitive and/or resistive loads.

TECHNICAL BACKGROUND

DE 11 2014 006 358 T5 describes a controller connected via optical couplers to gate control circuits provides for semiconductor switches. The gate control circuit uses a voltage along a coil for controlling the gate of the associated semiconductor switch.

US 2009/0310270 A1 describes a fast-responding short circuit protection system with self-reset for use in a circuit supplied by DC power. A voltage sense is provided for sensing a voltage along a switch and an inductor.

Electrical motors form loads which operate through the interaction between the motor's magnetic field and an electrical current in a wire winding to generate a mechanical force in form of a rotation of a shaft. Electrical motors in general can be powered by direct current sources such as batteries or rectifiers or by alternating current sources such as a power grid, an inverter or an electrical generator. There are different kinds of electrical motors, in particular asynchronous motors and synchronous motors. Loads, in particular electrical motors, connected to a power supply system require overload and/or overcurrent protection. In an electrical system, a situation may occur where an overcurrent flows through an electrical conductor leading to an excessive generation of heat and damaging the electrical equipment or load. The load can comprise a resistive load, a capacitive load or an inductive load such as an electrical motor M. There can be many different causes for causing an overcurrent including short circuits, an incorrect circuit design or ground faults. Further, there exists a variety of conventional overcurrent protection devices such as fuses, electromechanical circuit breakers or solid-state power switches. Fuses do melt when an overcurrent occurs thus interrupting the electrical current and consequently protecting the connected load. However, fuses are melting only at relatively high current amplitudes so that much electrical energy can be transferred to the connected load such as an electrical motor before the fuse does melt. This increases the risk of damaging components of the connected electrical motor. Further, after the cause of the overcurrent has been cleared it is necessary to replace the affected fuse.

An electrical motor as a load can comprise a rated power. In electrical engineering, the power rating of an equipment is the highest power input allowed to flow through the respective equipment. Overcurrent protection protects electrical equipment against excessive currents or currents beyond the acceptable current ratings, which can result from short circuits, ground faults and overload conditions. In contrast, overload protection protects against a situation where overload current causes overheating of the protected electrical equipment.

An overcurrent relay can be used as overload (thermal) protection to protect resistive loads. However, for inductive loads, the overcurrent relay cannot serve as overload protection. Overload relays usually have a longer time-setting than overcurrent relays.

Electrical protection devices can employ current sensors to measure an electrical current flowing to the connected load to detect a critical situation and to trigger automatically an electronic or electromechanical switch in case that a critical situation does arise. A current measurement element such as a Hall sensor may measure the electrical current and supply the measurement values to a controller or control logic which can switch off the switching component in case that the measured current exceeds a predetermined threshold value. Conventional protection sensors use semiconductor switches such as MOSFETs to protect connected loads against overcurrents. With increasing electrical currents flowing via the switched-on semiconductor switch, the voltage drop along the semiconductor switch does also increase so that there occurs a higher power loss at the semiconductor switch. Increasing power loss can cause damaging and even destruction of the semiconductor switch and/or electronic components within the connected electrical motor. Therefore, conventional protection circuits evaluate the voltage drop along its semiconductor switch and can switch off the semiconductor switch as soon as the voltage drop exceeds a threshold value. However, this conventional switch-off mechanism comes into operation only after the electrical current has already reached a high amplitude after a relatively long switch-off period. These conventional protection circuits work comparatively slow and require a high current level to trigger the respective switching component.

Accordingly, there is a need to provide an apparatus which is adapted to control a power supply to an electrical load and which protects the connected electrical load efficiently.

SUMMARY OF THE INVENTION

The invention provides according to a first aspect a load protection and control apparatus comprising an overcurrent protection circuit having at least one input terminal wherein each input terminal is configured to establish an electrical connection with a busbar to receive power from a power supply network or from a power distribution network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period.

The driver circuit of the overcurrent protection circuit comprises a low voltage side connected to a control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus.

The switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit. The predefined switch off period can be less than 1 millisecond.

The load protection and control apparatus further comprises in a possible embodiment a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

The connected load can comprise different load types including a resistive load, a capacitive load and/or an inductive load.

In a possible embodiment of the load protection and control apparatus, wherein each input terminal comprises a protruding electrical contact. The protruding electrical contacts at the input terminals can be configured to be inserted into matching contact slots of busbars or of a busbar adapter.

In a possible embodiment of the load protection and control apparatus according to the first aspect of the present invention, the load protection and control apparatus further comprises an overload protection circuit having a sensor component adapted to measure continuously the load current flowing to the output terminal notified to the control unit of the load protection and control apparatus adapted to determine an overload state and/or type of the electrical load on the basis of the measured load current profile.

In a further possible embodiment of the load protection and control apparatus according to the first aspect of the present invention, a control unit is adapted to control the driver circuit to switch-off the power switch if an overload state of the electrical load is determined by the control unit.

In a still further possible embodiment of the load protection and control apparatus according to the first aspect of the present invention, the control unit is adapted to control the electrical power supplied to the electrical load depending on an operation mode of the electrical load on the basis of the load current profile measured by the sensor component of the overload protection circuit and on the basis of a supply voltage profile measured by the sensor component of the power supply control circuit at the input terminal of the load protection and control apparatus.

In a still further possible embodiment of the load protection and control apparatus according to the first aspect of the present invention, the sensor component of the overcurrent protection circuit comprises a coil which is adapted to generate an induction voltage drop depending on the current rise speed of the load current flowing through the sensor component of the overcurrent protection circuit.

In a still further possible embodiment of the load protection and control apparatus according to the first aspect of the present invention, the sensor component of the overload protection circuit comprises a Hall sensor adapted to measure continuously the load current flowing through the output terminal of the load protection and control apparatus to provide the load current profile.

In a further possible embodiment of the load protection and control apparatus according to the first aspect of the present invention, the power supply control circuit has a sensor component formed by a voltage divider adapted to supply a fraction of the supply voltage at the input terminal to the control unit of the load protection and control apparatus to provide a supply voltage profile.

In a further possible embodiment of the load protection and control apparatus according to the first aspect of the present invention, the sensor component of the overload protection circuit and the sensor component of the power supply control circuit are connected to associated analog-to-digital converters adapted to convert the measured analog load current profile and the measured supply voltage profile into corresponding measurement values stored in a data memory of the control unit as load current profile data and supply voltage profile data.

In a further possible embodiment of the load protection and control apparatus according to the first aspect of the present invention, a processor of the control unit is adapted to calculate a power factor on the basis of the load current profile data and the supply voltage profile data stored in the data memory of the control unit.

In a further possible embodiment of the load protection and control apparatus according to the first aspect of the present invention, the electrical load is an electrical motor comprising as operation modes an idle operation mode wherein the electrical motor is switched off and the rotation speed of the electrical motor is zero, a start operation mode wherein the electrical motor is started and the rotation speed of the electrical motor is increased, a steady-state operation mode wherein the rotation speed of the electrical motor is maintained constant, and a stop operation mode wherein the electrical motor is stopped and the rotation speed of the electrical motor is decreased.

In a further possible embodiment of the load protection and control apparatus according to the first aspect of the present invention, the driver circuit is adapted to switch off the power switch automatically, if the applied sum voltage exceeds a configurable threshold voltage within the switch-off period to protect the load protection and control apparatus itself and the electrical load against overload and/or against overcurrent.

In a further possible embodiment of the load protection and control apparatus according to the first aspect of the present invention, a processor of the control unit is adapted to determine an operation mode and/or a specific operation state of the connected electrical load by processing the load current profile data and/or the supply voltage profile data stored in the data memory of the control unit.

In a further possible embodiment of the load protection and control apparatus according to the first aspect of the present invention, the control unit is adapted to control the driver circuit of the load protection and control apparatus on reception of a control command such that the power switch is switched either on or off according to the received control command.

In a further possible embodiment of the load protection and control apparatus according to the first aspect of the present invention, the control unit of the load protection and control apparatus is adapted to receive the control command from a user interface of the load protection and control apparatus, from a computer connected to said load protection and control apparatus or from a stored program control of an automation system. The control command can also be supplied by means of powerline communication (PLC) via the busbars to the input terminals of the load protection and control apparatus.

In a further possible embodiment of the load protection and control apparatus according to the first aspect of the present invention, the power switch of the load protection and control apparatus comprises an IGBT or a power MOSFET, in particular a SiC MOSFET, a GaN MOSFET or a ScAlN MOSFET.

In a further possible embodiment of the load protection and control apparatus according to the first aspect of the present invention, the control unit of the load protection and control apparatus is adapted to derive based on at least one operation parameter of the connected electrical load and the stored profile data a temperature profile of components of the electrical load and/or of components of the load protection and control apparatus and to control the driver circuit to switch off the power switch if a deviation from a predetermined temperature range is detected.

In a still further possible embodiment of the load protection and control apparatus according to the first aspect of the present invention, the power switch is switched on after a configurable wait period and/or after successful clearance of a switch-off cause and/or if other predetermined switch-on conditions are fulfilled.

In a still further possible embodiment of the load protection and control apparatus according to the first aspect of the present invention, the electrical load comprises a multiphase motor which receives via at least one load protection and control apparatus several electric current phases as operation load currents.

In a still further possible embodiment of the load protection and control apparatus according to the first aspect of the present invention, the load protection and control apparatus comprises for each electrical current phase an associated overcurrent protection circuit, a power supply control circuit and an overload protection circuit.

In a further possible embodiment of the load protection and control apparatus according to the first aspect of the present invention, for each electrical current phase or for each DC current direction a first power switch is provided for a positive current half-wave of an AC current or for a positive DC current and wherein a second power switch is provided for a negative current half-wave of an AC current or for a negative DC current.

In a further possible embodiment of the load protection and control apparatus according to the first aspect of the present invention, the power switches are connected via half-bridge or full-bridge rectifier circuits with associated driver circuits of the load protection and control apparatus.

In a further possible embodiment of the load protection and control apparatus according to the first aspect of the present invention, the load protection and control apparatus comprises a user interface adapted to signal an operation state of the load protection and control apparatus and/or an operation state of the connected electrical load.

In a further possible embodiment of the load protection and control apparatus according to the first aspect of the present invention, the driver circuit comprises a low voltage side connected to the control unit and a high voltage side connected to the power switch, wherein the low voltage side and the high voltage side of the driver circuit are galvanically separated from each other.

In a further possible embodiment of the load protection and control apparatus according to the first aspect of the present invention, the control unit is adapted to perform a phase angle control and/or to apply a predefined switching pattern to the power switch depending on the calculated power factor and the operation mode of the electrical load.

In a further possible embodiment of the load protection and control apparatus according to the first aspect of the present invention, the processor of the control unit has access to at least one load operation characteristic of the electrical load indicating for operation parameters at least one admissible operation zone, at least one critical operation zone and/or at least one inadmissible operation zone.

The processor of the control unit can also have access to at least one operation characteristic of a component of the load protection and control apparatus itself indicating for operation parameters of the respective component at least one admissible operation zone, at least one critical operation zone and/or at least one inadmissible operation zone.

In a further possible embodiment of the load protection and control apparatus according to the first aspect of the present invention, the processor of the control unit is adapted to evaluate the load current profile data and/or the supply voltage profile data stored in the data memory of the control unit with respect to the load operation characteristics of the electrical load and/or of the internal component to determine whether operation parameter combinations of different operation parameters are in a critical or inadmissible operation zone of the load operation characteristic and/or of a component operation characteristics.

In a further possible embodiment of the load protection and control apparatus according to the first aspect of the present invention, the control unit outputs a warning signal via an output interface of the load protection and control apparatus if an operation parameter combination of the operation parameters is determined to be in a critical operation zone of a load operation characteristic of the electrical load and/or the operation characteristic of the component of the load protection and control apparatus. This component may comprise e.g. the power switch of the load protection and control apparatus.

In a further possible embodiment of the load protection and control apparatus according to the first aspect of the present invention, the control unit of the load protection and control apparatus generates automatically a switch-off control signal applied to the power switch to switch off the load current if an operation parameter combination of operation parameters is determined to be in an inadmissible operation zone of a load operation characteristic of the electrical load and/or the operation characteristic of the monitored integrated component of the load protection and control apparatus.

In a further possible embodiment of the load protection and control apparatus according to the first aspect of the present invention, different load operation characteristics and/or component operation characteristics for different operation parameter combinations are stored in a memory of the control unit.

In a further possible embodiment of the load protection and control apparatus according to the first aspect of the present invention, the control unit of the load protection and control apparatus is adapted to determine whether the received supply voltages at different input terminals provided for different phases indicate a symmetrical power supply of the load protection and control apparatus by the power supply network connected to the input terminals of the load protection and control apparatus and/or a symmetrical power supply of the connected load by the load control apparatus on the basis of the supply voltage profile data stored in the data memory of the control unit.

A symmetrical power supply of the connected load by the load protection and control apparatus can be monitored by the control unit.

In a further possible embodiment of the load protection and control apparatus according to the first aspect of the present invention, the control unit is adapted to switch off automatically the power switches if an unsymmetrical power supply of the load protection and control apparatus by the power supply network or an unsymmetrical power supply of the connected load by the load protection and control apparatus is recognized by the control unit.

The invention provides according to a further aspect an automation system comprising a load protection and control apparatus according to the first aspect of the present invention and an electrical load connected to the output terminal of said load protection and control apparatus.

The invention provides according to a further aspect a method for controlling a power supply to a protected electrical load comprising the steps of:

receiving electrical power from a power supply network by at least one input terminal from a busbar of a busbar system;

generating a voltage drop at a current rise speed sensor component corresponding to a current rise speed of an electrical load current flowing from the input terminal via the current rise speed sensor component and a power switch to an output terminal to which the electrical load is connected;

switching the power switch automatically off by a driver circuit having a low voltage side connected to a control unit to receive control signals from the control unit and having a high voltage side which comprises logical gates provided to combine a signal applied to an input at the high voltage side logically with control signals received at the low voltage side of the driver circuit from the control unit, wherein the switching is performed within a predefined switch-off period if the generated voltage drop plus a voltage drop along the power switch applied as a sum voltage to the input at a high voltage side of the driver circuit exceeds a configurable threshold voltage to provide protection against an overcurrent, wherein the switch-off operation is performed by the driver circuit without involving the control unit, wherein the switch-off period is predefined by a hardware circuitry connecting the current rise speed sensor component to the input of the driver circuit and by internal propagation times of logical signals propagating via the logical gates of the high voltage side of the driver circuit.

In a possible embodiment the method further comprises the step of controlling an electrical power supplied to the connected electrical load by the control unit on the basis of a measured load current profile and a measured supply voltage profile, wherein a supply voltage at the input terminal is measured by a voltage sensor component and notified to the control unit to provide the supply voltage profile.

In a possible embodiment the method further comprises the steps of:

determining an overload state of the connected electrical load by the control unit on the basis of the measured load current profile and switching off the power switch by the driver circuit under control of the control unit or by an electromechanical relay if an overload state of the connected electrical load is determined by the control unit.

In a possible embodiment of the method a type of the connected load is determined by the control unit on the basis of the measured load current profile and the measured supply voltage profile, wherein the type of the electrical load comprises a resistive, capacitive or inductive load, wherein the electrical power supplied to the electrical load is controlled by the control unit depending on the determined type of the connected electrical load.

The invention provides according to a further aspect a busbar system comprising busbars to which electrical loads are connectable by means of load protection and control apparatuses according to the first aspect of the present invention.

The load protection and control apparatuses of the busbar system are provided for protecting and controlling the electrical loads connected to the load protection and control apparatuses, wherein the load protection and control apparatus comprises an overcurrent protection circuit having at least one input terminal wherein each input terminal is configured to establish an electrical connection with a busbar of the busbar system to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period, wherein the driver circuit comprises a low voltage side connected to a the control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit.

The load protection and control apparatus of the busbar system can further comprise a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

The load protection and control apparatus of the busbar system is connectable to massive busbars by means of busbar adapter devices having latches to engage massive busbars from behind.

The load protection and control apparatus of the busbar system is connectable to hybrid busbars by means of protruding electrical contacts configured to be inserted into matching slots of the hybrid busbars.

The invention provides to a further aspect a system comprising DIN rail profiles comprising adapted to receive DIN rail adapters provided for supporting load protection and control apparatuses according to the first aspect of the present invention.

The invention provides to a further aspect a fuse housing comprising an integrated load protection and control apparatus according to the first aspect of the present invention.

BRIEF DESCRIPTION OF FIGURES

In the following, possible embodiments of the different aspects of the present invention are described in detail with respect to the enclosed figures.

FIGS. 1A, 1B, 1C shows a block diagram of a possible exemplary embodiments of a load protection and control apparatus according to the first aspect of the present invention;

DETAILED DESCRIPTION OF EMBODIMENTS

As can be seen from the block diagram of FIG. 1A, a load control and/or load protection apparatus 1 according to the first aspect of the present invention (in the following load control apparatus 1) can comprise several main circuits including an overcurrent protection circuit 1A, an overload protection circuit 1B and a power supply control circuit 1C. The load control apparatus 1 can be provided between a busbar system of a power supply network PSN and an electrical load as illustrated in FIG. 1. The electrical load is connected to an output terminal 3 of the load control apparatus 1. In a possible embodiment, the load control apparatus 1 comprises an overcurrent protection circuit 1A and a power supply control circuit 1C. In a still further possible embodiment, the load control apparatus 1 comprises an overcurrent protection circuit 1A, an overload protection circuit 1B and a power supply control circuit 1C as shown in FIG. 1 and FIG. 2. The load can comprise an inductive load such as a motor, a capacitive load or a resistive load or a combination between them.

In general, an electrical load is an electrical component or portion of a circuit that consumes electric power. An electrical load consumes electrical energy in the form of the received electrical currents and can transform this electrical energy into other forms like heat, light, work, etc. Inductive loads also called lagging loads are AC loads that are predominantly inductive in nature so that the alternating current lags behind the alternating voltage when electrical current flows into the load. In contrast, a capacitive load is a load that has a capacitive, i.e. negative, reactance at the frequency of operation. A capacitive load causes the electrical current wave to lead the voltage wave. Thus, the power factor of a capacitive load is leading. A resistive load is a type of load that draws current in the same proportion of the applied voltage. A resistive load is typically used to convert electrical current into other form of energy such as heat. The voltage wave and the current phase are of the same phase as of a resistive load.

Figure 1C:
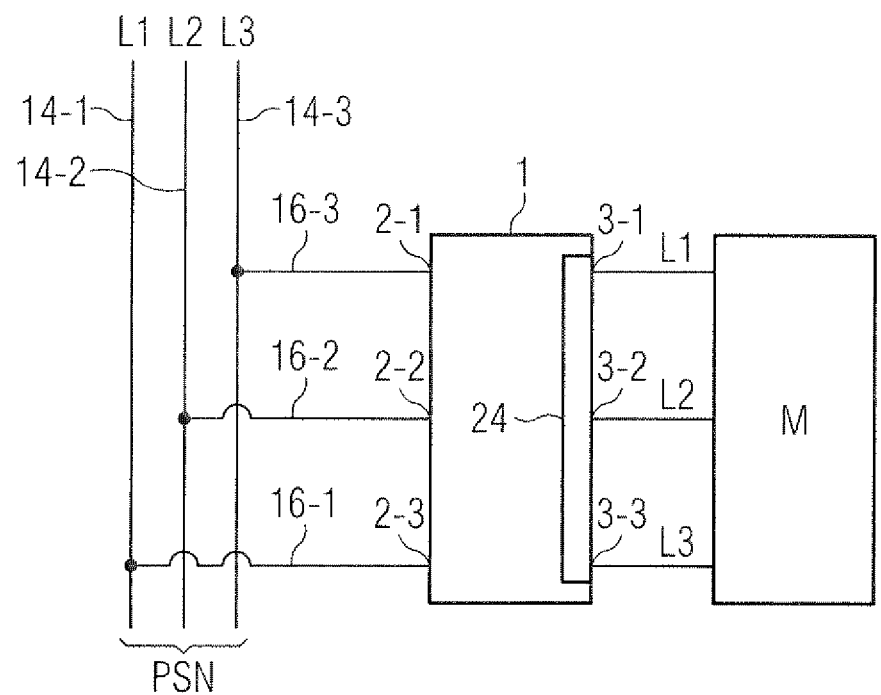
Figure 2:
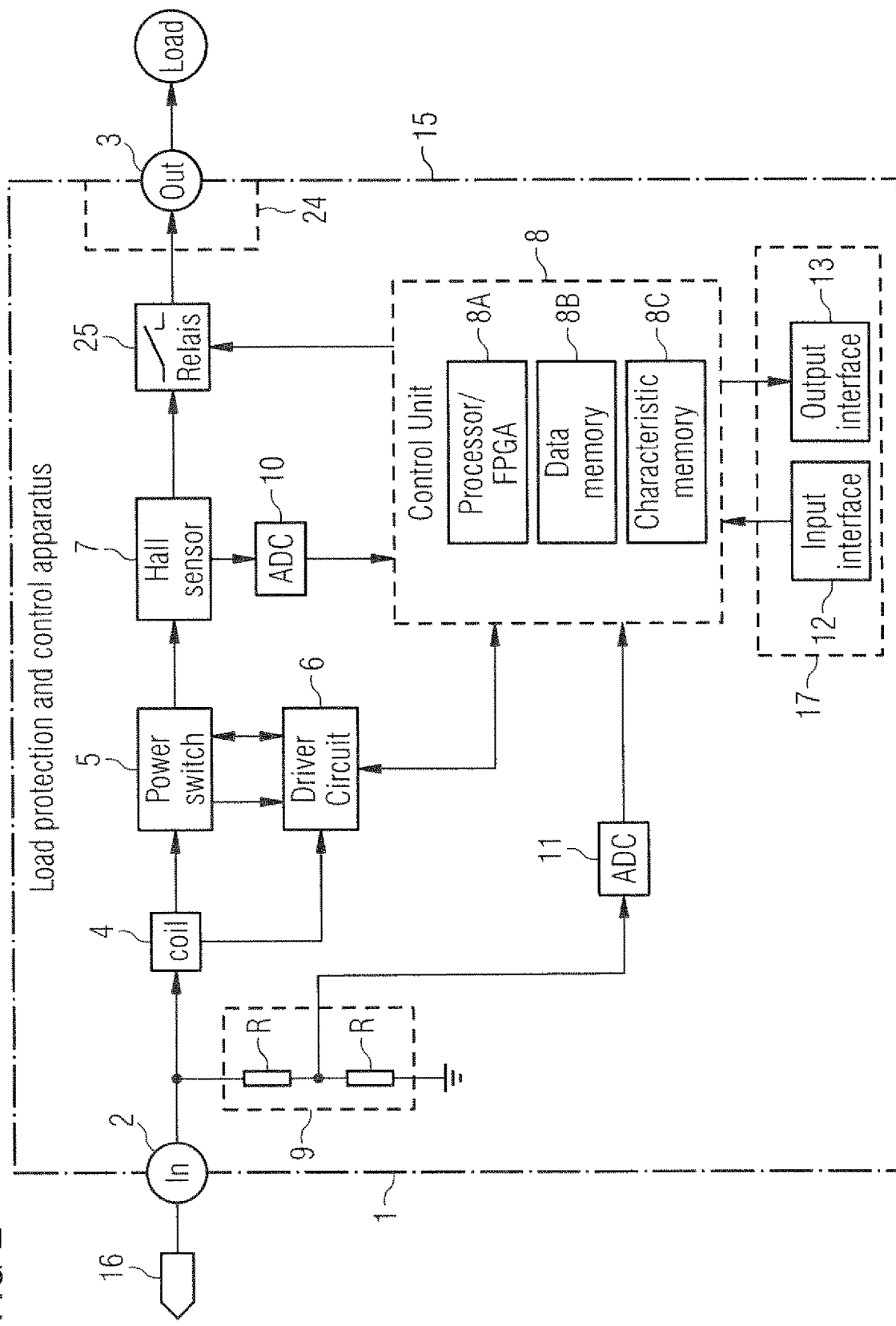
FIG. 2 shows a block diagram of a possible exemplary embodiment of a load protection and control apparatus according to the first aspect of the present invention.
Figure 12A:
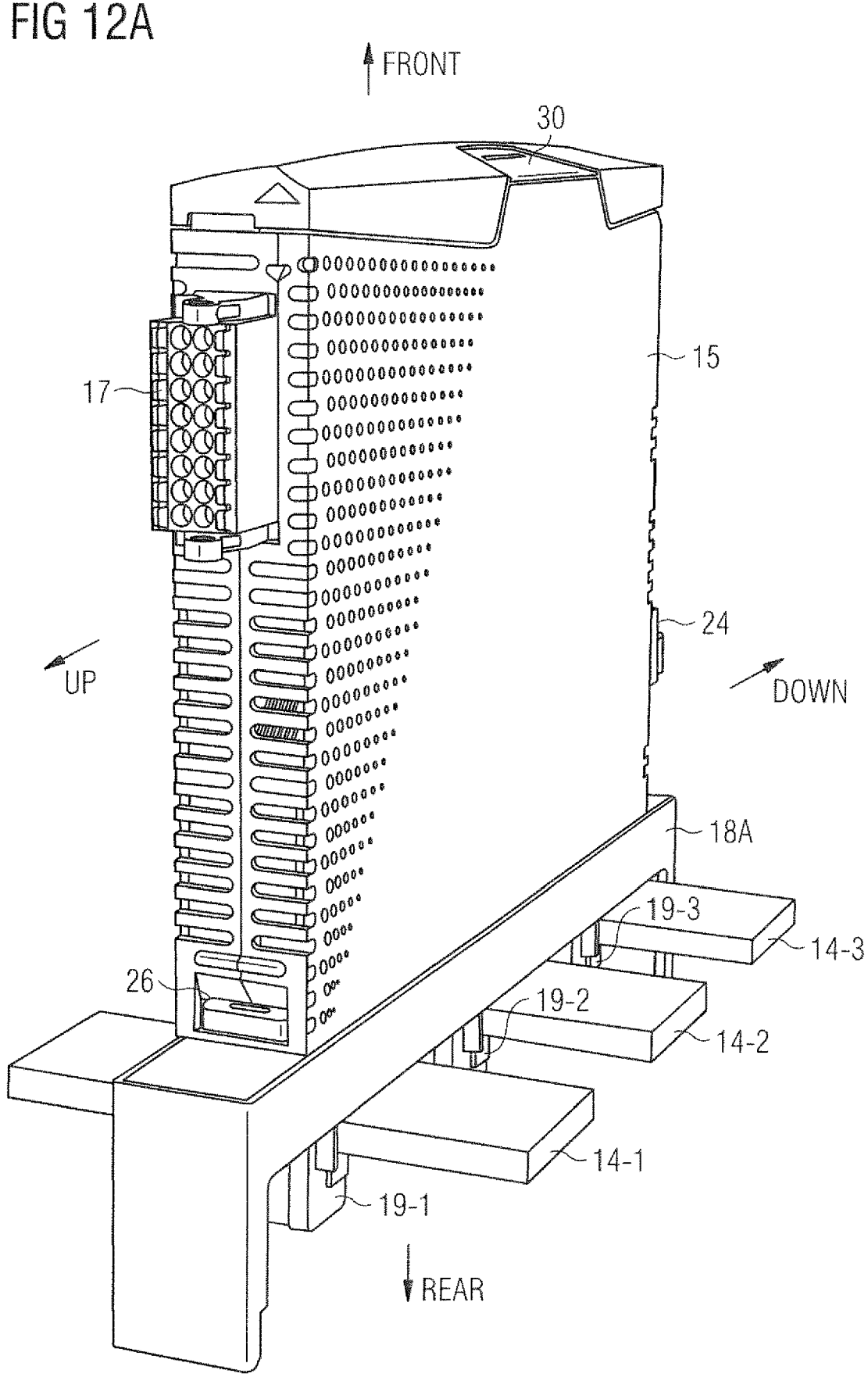
FIGS. 12A-12D and 13A-13B show exemplary embodiments of a load protection and control apparatus according to the present invention.
Figure 12B:
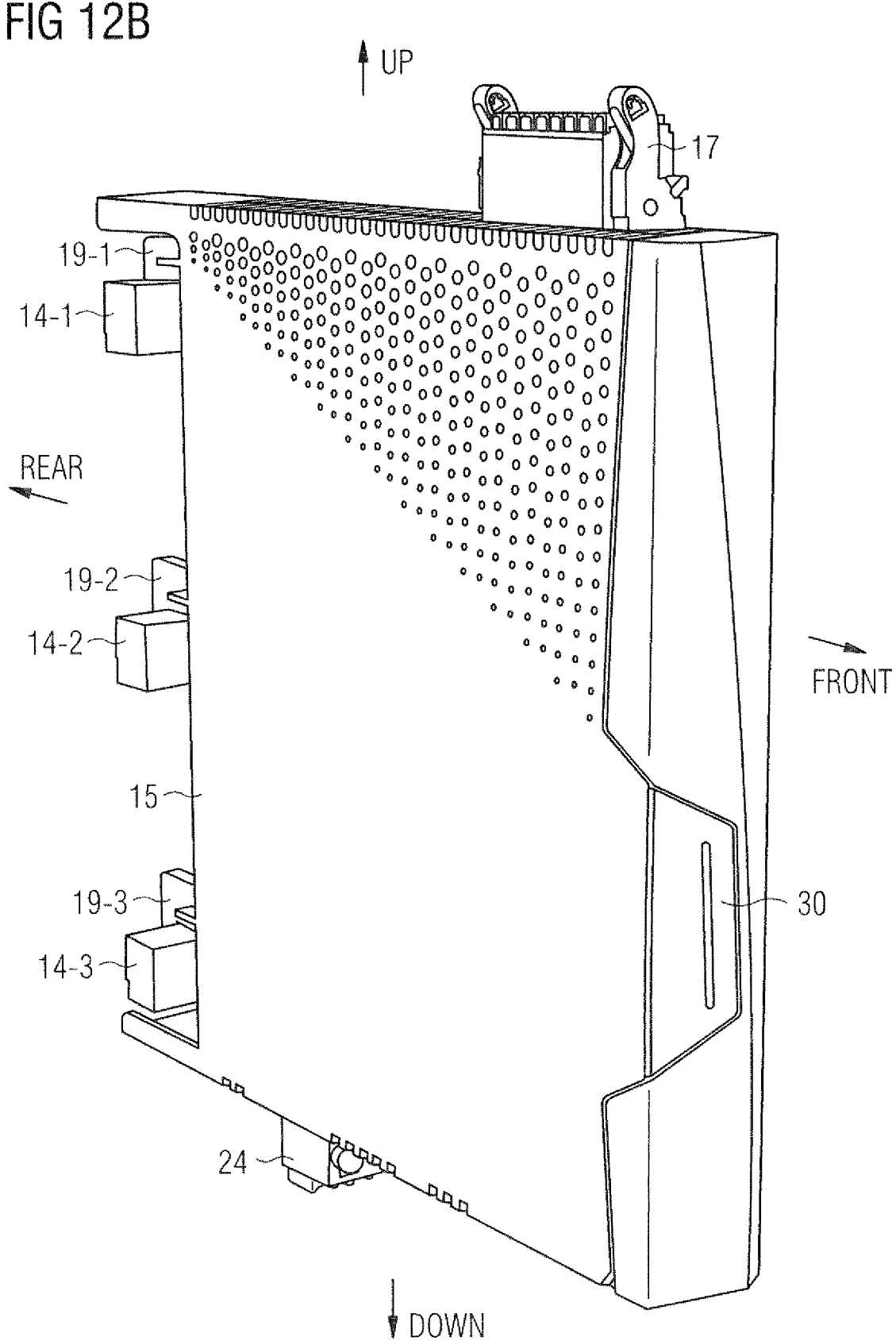
Figure 12C:
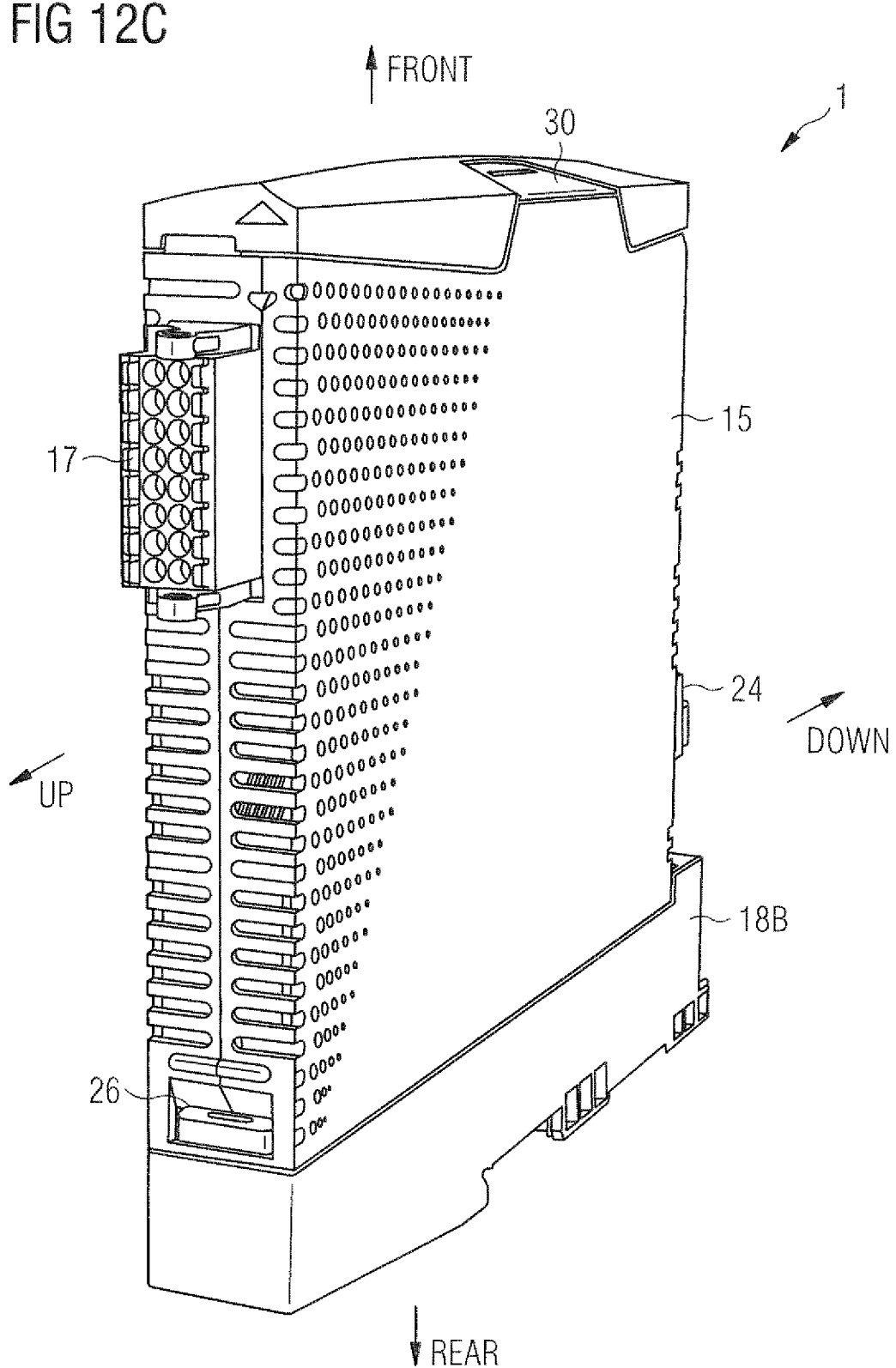
Figure 14A:
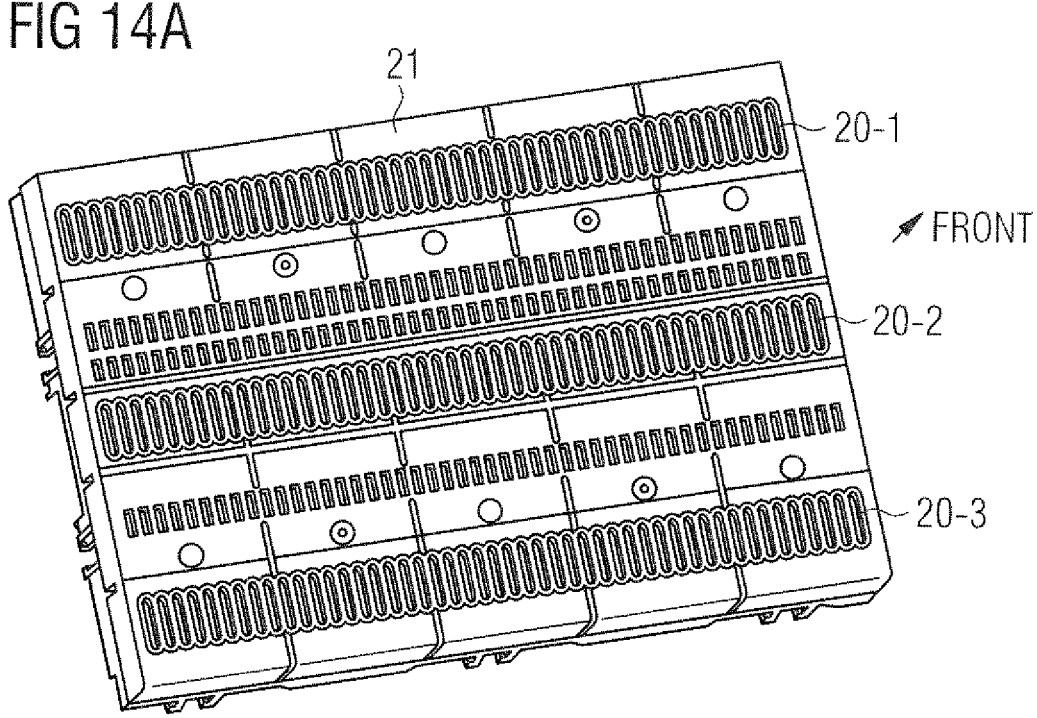
FIGS. 14A, 14B illustrate a hybrid busbar system to which a load protection and control apparatus can be connected.
Figure 14B:
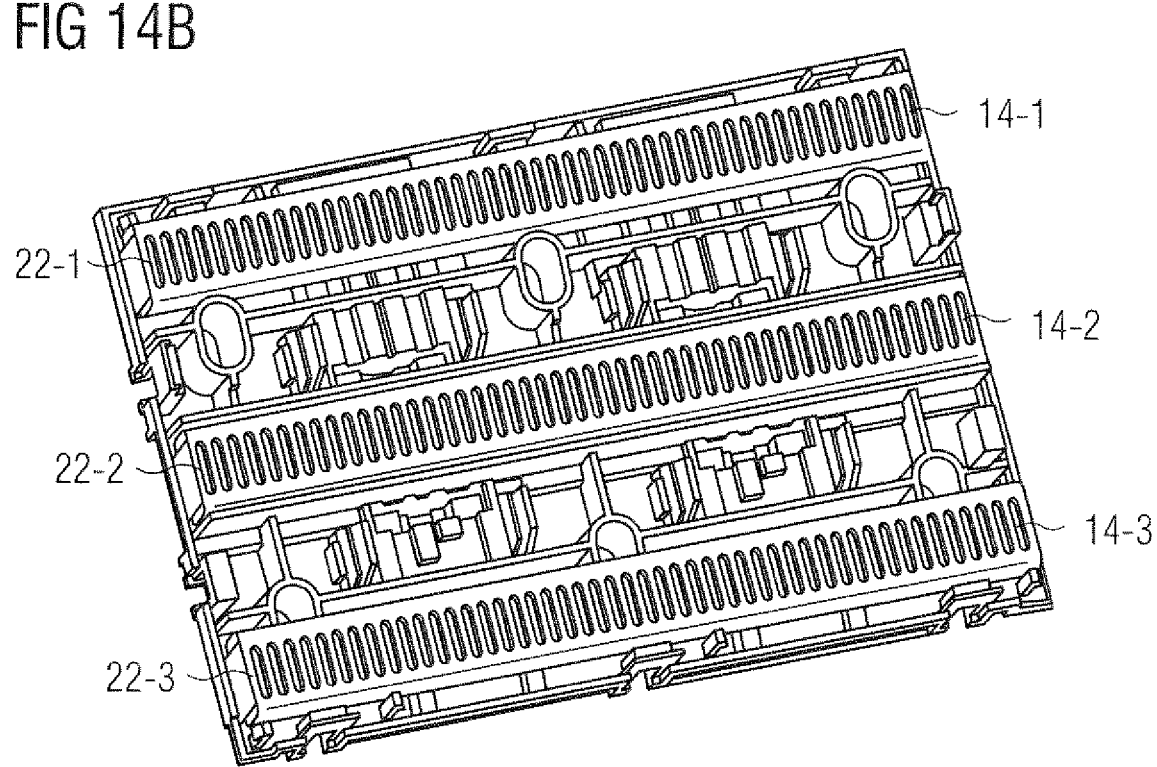

FIGS. 1A, 1B, 1C illustrate exemplary different arrangements where a load protection and control apparatus 1 according to the present invention can be used. As can be seen in FIG. 1A, the load control apparatus 1 can be used for a single load, in particular a resistive, capacitive or inductive load. In the example illustrated in FIG. 1A, three loads load A, load B, load C are connected via an associated load control apparatus 1 to one of the phases L1, L2, L3 of the power supply network PSN. In this embodiment, each load control apparatus 1 comprises a single input terminal 2 and a single output terminal 3. Each load control apparatus 1 can be integrated in a housing 15 including an overcurrent protection circuit 1A, an overload protection circuit 1B and/or a power supply control circuit 1C. At the input terminal 2, the load control apparatus 1 is connected to the busbar system of the power supply network PSN. A protruding electrical contact 16 can be provided at the input terminal 2. This protruding electrical contact 16 can be configured to be guided through guide openings 20-$i$ of a touch-safe protection cover 21 including the busbars 14 and then be inserted into matching contact slots 22 provided within the respective busbars 14 lying directly beneath the contact openings 20 of the protection cover 21 to establish the electrical connection with the respective busbars 14 as also shown in FIGS. 14A, 14B. In an alternative embodiment, the electrical contact 16 can be configured to be attached to a massive busbar which do not provide any contact slots. In the embodiment of FIG. 1A, the busbar system of the power supply network PSN comprises three busbars 14-1, 14-2, 14-3 connected to the input terminals 2-1, 2-2, 2-3 of the three different load control apparatuses 1 via electrical contacts 16-1, 16-2, 16-3, respectively. Each busbar 14-*i* may comprise equidistant electrical slots 22 adapted to receive a protruding electrical contact 16 of the load control apparatus 1 connected to the input terminal 2 of this load control apparatus 1. Further, the protruding electrical contacts 16 of the load control apparatus 1 may also be inserted into receiving contact slots of adapter device 18A, 18B shown in FIGS. 12A, 12C. FIG. 12A shows a three-phase busbar adapter 18A for three massive busbars 14-1, 14-2, 14-3. FIG. 12C shows a DIN rail adapter 18B.

FIG. 1B shows as an example for an electrical load a three-phase electrical motor M. In the illustrated example, the electrical motor M is connected via three load control apparatuses 1-1, 1-2, 1-3 to three busbars 14-1, 14-2, 14-3 of the busbar system of the power supply network PSN.

In an alternative arrangement, the three-phase electrical motor M can be connected via a single load control apparatus 1 to the busbar system of the power supply network PSN. In this embodiment, the load control apparatus 1 may comprise three overcurrent protection circuits 1A, three overload protection circuits 1B and three power supply control circuits 1C in parallel. In an alternative implementation, a single control unit 8 may be provided used for the three signal paths integrated in the load control apparatus 1. The load control apparatus 1 comprises a load interface 24 having three output terminals 3-1, 3-2, 3-3 for three different phases L1, L2, L3 as shown in FIG. 1C.

The load control apparatus 1 illustrated in the different embodiments of FIGS. 1A, 1B, 1C can be used for controlling a power supplied to the respective load. Further, the control apparatus 1 provides integrated protection against overcurrent and overload. Instead of busbars 14-*i*, other electrical carrying profiles can be used. Busbars 14 and/or the current carrying rails can extend in horizontal or vertical direction. The busbars 14 and/or current carrying rails can also be used for carrying communication signals between different loads connected to the system, e.g. by means of powerline communication PLC. In a possible embodiment, the protruding electrical contacts 16 provided at the input terminal 2 can also comprise protection ribs provided to protect the protruding electrical contacts 16 against mechanical damage. These protruding electrical contacts 16 further provide a mechanical support of the load control apparatus 1 when being connected to the at least busbar 14 or profile rail of the system. The loads may also be connected to specific profile rails such as top hat rails or DIN rails.

In a possible embodiment, the different load protection and control apparatuses 1 illustrated in the examples of FIGS. 1A, 1B, 1C can be integrated into a housing 15 having the same form as a conventional fuse such as a NH-fuse. The load control apparatus 1 can also be integrated into a socket and/or a plug component of the system. The load control apparatus 1 can in a possible implementation be placed into a fuse holder of a conventional fuse element to replace said fuse element. For instance, the load control apparatus 1 can be integrated in a plug element plugged into a socket of the load such as the electrical motor M to provide electrical connection via the output terminal 3 between the load control apparatus 1 and the respective load, i.e. electrical motor M. Accordingly, the system may comprise a single or a multiphase electrical motor M having sockets adapted to receive a corresponding housing 15 of a load control apparatus 1 to establish an electrical connection with the busbar system of the power supply network PSN. In this way, the mounting of the load such as the electrical motor M to the busbar system can be facilitated.

FIG. 2 shows a possible embodiment of a load protection and control apparatus 1 including an overcurrent protection circuit 1A, an overload protection circuit 1B and a power supply control circuit 1C. The overcurrent protection circuit 1A has an input terminal 2 to receive electrical power from the power supply network PSN shown in FIG. 1. The load control apparatus 1 further comprises an output terminal 3 used to connect an electrical load to the load control apparatus 1. As can be seen in FIG. 2, a sensor component 4 is connected in series with a power switch 5. The sensor component 4 is adapted to generate directly a voltage drop $\Delta U_4$ corresponding to a current rise speed of the electrical load current $I_L$ flowing from the input terminal 2 of the load control apparatus 1 via the sensor component 4 and the power switch 5 to the output terminal 3 of the load control apparatus 1. The overcurrent protection circuit (OCPC) 1A includes the power switch 5 through which the electrical load receives the electrical load current $I_L$ and the sensor component 4 connected in series with the power switch 5. In a possible embodiment, the sensor component 4 of the overcurrent protection circuit 1A comprises a coil which is adapted to generate an induction voltage drop $\Delta U_4$ depending on the current rise speed of the load current $I_L$ flowing through the sensor component 4 of the overcurrent protection circuit 1A. The overcurrent protection circuit 1A further comprises a driver circuit 6 as shown in the block diagram of FIG. 2. The driver circuit 6 is adapted to detect an occurring overcurrent depending on the voltage drop $\Delta U_4$ generated by the sensor component 4 and a voltage drop $\Delta U_5$ along the power switch 5. The voltage drop $\Delta U_4$ generated by the sensor component 4 and the voltage drop $\Delta U_5$ along the power switch 5 is applied to the driver circuit 6 as a sum voltage $U_\Sigma = \Delta U_4 + \Delta U_5$. The hardwired driver circuit 6 is adapted to switch off the power switch 5 upon detection of an overcurrent with a switch-off period of less than five microseconds. The non-linear voltage drop $\Delta U_5$ on the power switch 5 is used as a value representative of the momentary current in the sum voltage $U_E$.

The protected switch-off is responsive to a combination of both of the value of the current and to the value of the rate of change of the current.

The load protection and control apparatus 1 according to the present invention further comprises in the illustrated embodiment of FIG. 2 a power supply control circuit (PSCC) 1C. The power supply control circuit 1C comprises a sensor component 9 adapted to measure at the input terminal 2 of the load control apparatus 1 a supply voltage U notified to a control unit 8 of the load control apparatus 1. The control unit 8 is adapted to control the electrical power supplied to the electrical load depending on a type and/or an operation mode of the electrical load. The type of the electrical load can comprise a resistive, inductive or capacitive load type. In the illustrated embodiment of FIG. 2, the power supply control circuit 1C has a sensor component 9 formed by a voltage divider adapted to supply a fraction of the supply voltage Vin at the input terminal 2 of the load control apparatus 1 to the control unit 8 of the load control apparatus 1 to provide a supply voltage profile over time. For a capacitive load, an additional voltage divider 9 can be provided at the output terminal 3. Only if the voltage Vin at the input terminal 2 is equal to the voltage Vout at the out terminal 3 the capacitive load can be switched on.

Further in the embodiment of FIG. 2, the load protection and control apparatus 1 also comprises an overload protection circuit (OLPC) 1B having a sensor component 7 adapted to measure continuously the load current $I_L$ flowing to the output terminal 3. The measured load current $I_L$ is notified by the sensor component 7 to the control unit 8 of the load control apparatus 1 which is adapted to determine an overload state of the electrical load on the basis of the measured load current profile. The sensor component 7 can also provide measurements to the driver circuit 6 for fault detection. The control unit 8 of the load control apparatus 1 is further adapted to control the driver circuit 6 to switch off the power switch 5 automatically if an overload state of the electrical load has been determined by the control unit 8. As can be seen in FIG. 2, the sensor component 7 of the overload protection circuit 1B and the sensor component 9 of the power supply control circuit 1C are both connected to associated analog-to-digital converters 10, 11. The analog-to-digital converters 10, 11 are adapted to convert the measured analog load current profile received from the sensor component 7 and the measured supply voltage profile measured by the sensor component 9 into corresponding measurement values (samples).

Figure 12D:
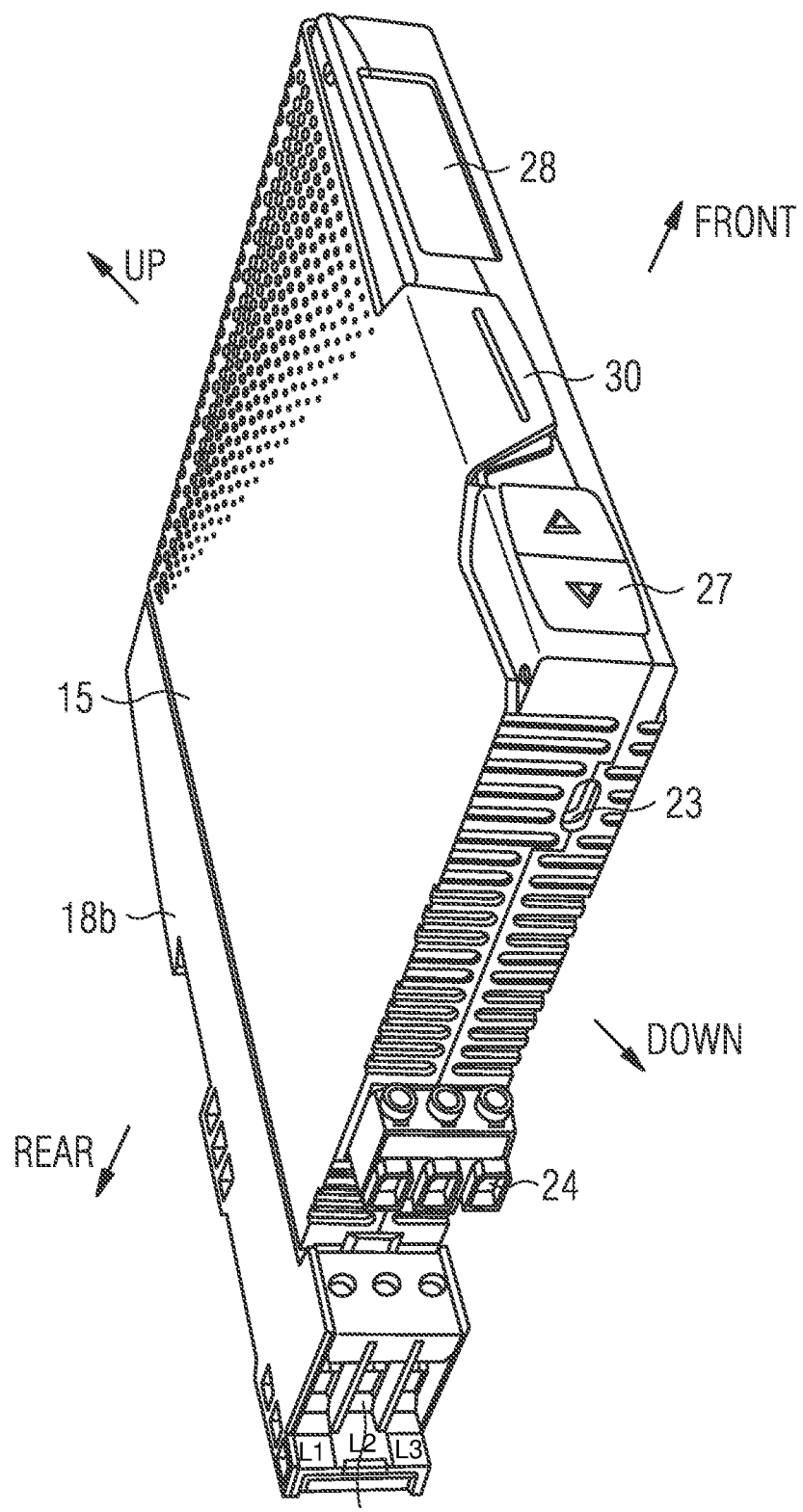

The resolution of the ADCs 10, 11 can comprise at least 12 bits. The sampling rate can comprise e.g. 4 kHz. The ADCs 10, 11 can comprise separate components or can also form part of a processor of the control unit 8. The measurement values provided by the analog-to-digital converters 10, 11 are stored as data samples in a data memory of the control unit 8 as load current profile data and as supply voltage profile data. In the illustrated embodiment of FIG. 2, the control unit 8 comprises a processor or a FPGA circuit 8A and a data memory 8B to store on the fly during operation load current profile data and supply voltage profile data. The control unit 8 can further comprise a memory 8C to store different load operation characteristics, i.e. operation characteristics for different operation parameters and/or for different types of loads, i.e. for resistive, capacitive or inductive loads. The data memory 8B and/or the memory 8C can be insertable into a slot 23 or socket 23 as shown in FIG. 12D. This slot 23 can be at the downside of the housing 15 when the apparatus is mounted on a DIN rail or on at least one horizontal busbar 14. The slot 23 may also be provided at the front side of the housing 15 when the apparatus 1 is mounted.

In a possible embodiment, the overload protection circuit 1B can also include an electromechanical relay 14 connected in series with the power switch 5 and controlled by the control unit 8. As soon as an overload state is recognized by the control unit 8, it can either command the driver circuit 6 to open the power switch 5 and/or control the relay to open and interrupt the current flow. The sensor component 7 can comprise in a possible embodiment a Hall sensor 7 as shown in FIG. 2. As an alternative also a GMR sensor 7 can be used. In a still further embodiment a shunt resistor or a transformer can be used to provide current measurement values to the ADC 10. A relay circuit 25 can be connected in series with the sensor component 7 as shown in FIG. 2.

The control unit 8 having a processor 8A is adapted to control the electrical power supply to the electrical load connected to the output terminal 3 of the load control apparatus 1 depending on a type and/or operation mode of the electrical load and on the basis of the load current profile measured by the sensor component 7 of the overload protection circuit 1B and on the basis of the supply voltage profile measured by the sensor component 9 of the power supply control circuit 1C at the input terminal 2 of the load control apparatus 1. In a possible embodiment, the sensor component 7 of the overload protection circuit 1B comprises a Hall sensor adapted to measure continuously the load current $I_L$ flowing to the output terminal 3 of the load control apparatus 1 to provide the load current profile. The sensor component 7 can also comprise a GMR sensor or a transformer.

In a possible embodiment, the processor or FPGA 8A of the control unit 8 is adapted to calculate a power factor cos φ on the basis of the load current profile data and the supply voltage profile data stored in the data memory 8B of the control unit 8. The profile data can be stored for a predetermined moving time window in the data memory 8B.

Figure 3:
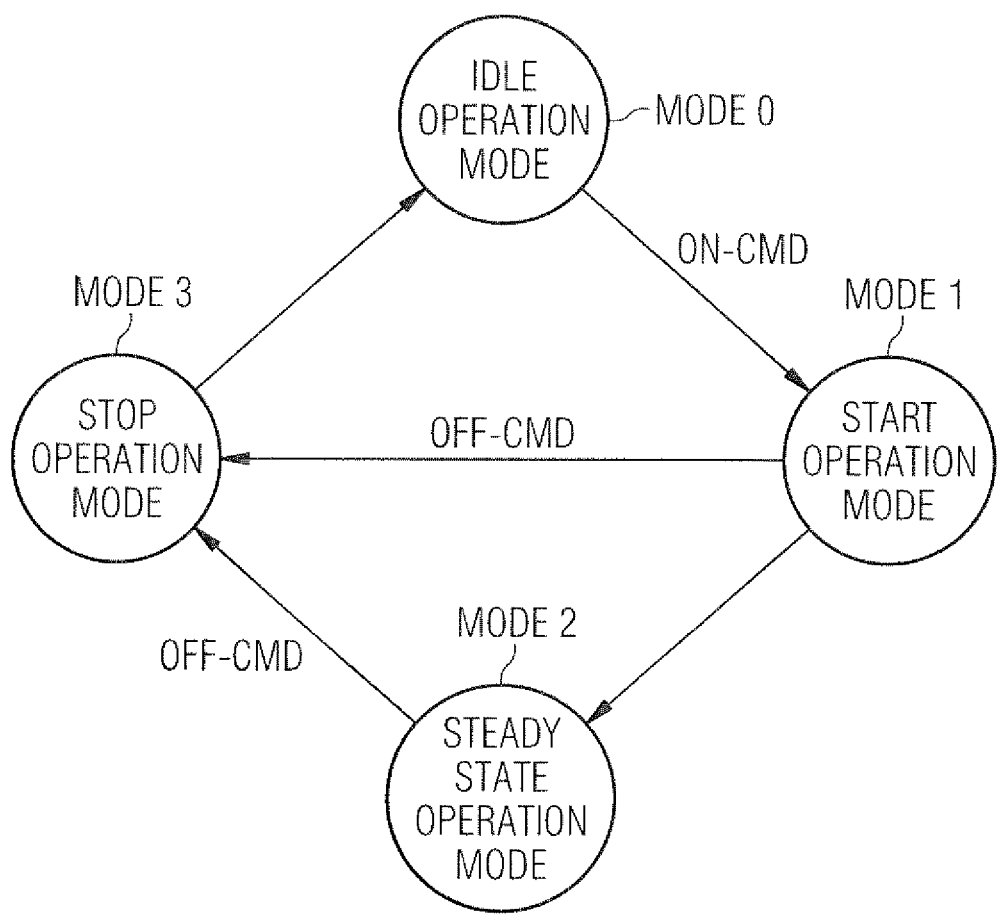
FIG. 3 shows a state diagram to illustrate a possible exemplary implementation of a load protection and control apparatus according to the first aspect of the present invention.

The electrical load connected to the output terminal 3 can comprise different operation modes. For instance, an electrical motor M as an inductive load can comprise different operation modes. FIG. 3 shows a state diagram to illustrate different possible operation modes of an electrical motor connected as a load to the output terminal 3 of the load control apparatus 1. In the illustrated example, the connected electrical motor M comprises an idle operation mode, a start operation mode, a steady-state operation mode and a stop operation mode. In the idle operation mode, the electrical motor M is switched off and the rotation speed of the electrical motor M is zero. In response to an on-command, a transition is performed from the idle operation mode into the start operation mode. In the start operation mode, the electrical motor M is started and the rotation speed of the electrical motor M is increased. In the steady-state operation mode of the motor M, the rotation speed of the electrical motor M is maintained constant. Further, in a stop operation mode, the electrical motor M is stopped and the rotation speed of the electrical motor M is decreased. In response to an off-command, either in the start operation mode or in the steady-state operation mode, the control unit 8 transits into a stop operation mode until the rotation speed of the electrical motor M becomes zero.

The processor or FPGA 8A of the control unit 8 is adapted to determine the operation mode and/or a specific operation state of the connected electrical load such as a motor by processing the load current profile data and/or the supply voltage profile data available in the data memory 8B of the control unit 8.

As also illustrated in the state diagram of FIG. 3, the control unit 8 is adapted to control the driver circuit 6 of the load protection and control apparatus 1 on reception of a control command CMD such that the power switch 5 is switched either on or off according to the received control command CMD. In a possible embodiment, the control unit 8 of the load control apparatus 1 is adapted to receive the control command CMD from a user or data interface 17 of the load protection and control apparatus 1. In the illustrated exemplary embodiment of FIG. 2, the load protection and control apparatus 1 comprises an input interface 12 and an output interface 13 forming the user or data interface 17. In an alternative embodiment, the control unit 8 of the load protection and control apparatus 1 can also receive a control command from a computer connected to the load protection and control apparatus 1 or from a stored program control of an automation system, e.g. via the input interface 12 forming part of a data interface integrated in the housing 15 and connected via a data cable to the computer.

In a possible embodiment, the control unit 8 of the load protection and control apparatus 1 is adapted to derive based on at least one operation parameter of the connected electrical load and the profile data stored in the data memory 8B an associated temperature profile of components of the electrical load and/or of components of the load control apparatus 1 itself and is further adapted to control the driver circuit 6 to switch off the power switch 5 if a deviation from a predetermined temperature range has been detected. The power switch 5 of the load control apparatus 1 can in a possible embodiment also be switched on after a configurable wait period and/or after successful clearance of a switch-off cause and/or if other predetermined switch-on conditions are fulfilled. The power switch 5 can comprise different kinds of solid-state devices including an IGBT or a power MOSFET. The power MOSFET can comprise a SiC MOSFET, a GaN MOSFET or a ScAlN MOSFET. The connected electrical load as shown in FIG. 2 can comprise in a possible embodiment a multiphase motor which receives via the load control apparatus 1 several electrical current phases L as operation load currents $I_L$. In a possible implementation, the load control apparatus 1 comprises for each electrical current phase L an overcurrent protection circuit 1A, a power supply control circuit 1C and an overload protection circuit 1B. In a possible embodiment, the electrical load is an electrical motor M, in particular a three-phase electrical motor M. The three-phase electrical motor M can comprise a three-phase induction motor, i.e. an asynchronous motor. The induction motor uses electrical current delivered in three phases L in a sequence into the coils of a stator to create a rotating magnetic field. This magnetic field induces an electrical field in a coil or squirrel cage to drive a rotor of the induction motor M. The difference in speed between the rotor, i.e. the synchronous speed, and the rotating magnetic field is also called the slip. A symmetrical three-phase winding system of the stator of the induction motor M is connected to a three-phase power supply network PSN with the appropriate voltage and frequency. Sinusoidal currents of the same amplitude can flow in each of the three winding phases L. Each of the electrical currents are temporarily offset from each other by 120°. Since the phases L are also spatially offset by 120°, the stator of the electrical motor M builds up a magnetic field that rotates with the frequency of the applied voltage. The rotating magnetic field induces an electrical voltage in the rotor winding or rotor bars. Short circuit currents can flow because the winding is short-circuited by a ring. Together with the rotating magnetic field, these electrical currents build mechanical forces and produce a torque over the radius of the rotor that can accelerate the rotor speed in the direction of the rotating field. In the induction motor, the frequency of the voltage generated in the rotor of the electrical motor M drops as the speed of the rotor increases. This is because the difference between the rotating field speed and the rotor speed becomes smaller. If the rotor of the electrical motor M were to turn at the same speed as the rotating magnetic field, it would rotate synchronously and no voltage would be induced and the electrical motor M would not be able to develop any torque as a result. However, the load torque and friction torques in the bearings lead to a difference between the rotor speed and the rotating magnetic field speed and this results in an equilibrium between the acceleration torque and the load torque. As a consequence, the electrical induction motor runs asynchronously and is also called an asynchronous motor. In a possible embodiment, the load protection and control apparatus 1 is provided for an asynchronous induction motor M connected to the output terminal 3 of the load interface 24 of at least one load control apparatus 1.

The load control apparatus 1 according to the present invention as illustrated in FIGS. 1, 2 can also be provided for other kinds of electrical loads, in particular also for a synchronous motor. In a synchronous motor the rotating magnetic field of the stator is synchronous to the magnetic field of the rotor. The load protection and control apparatus 1 according to the present invention can also be used for DC driven motors.

Figure 9:
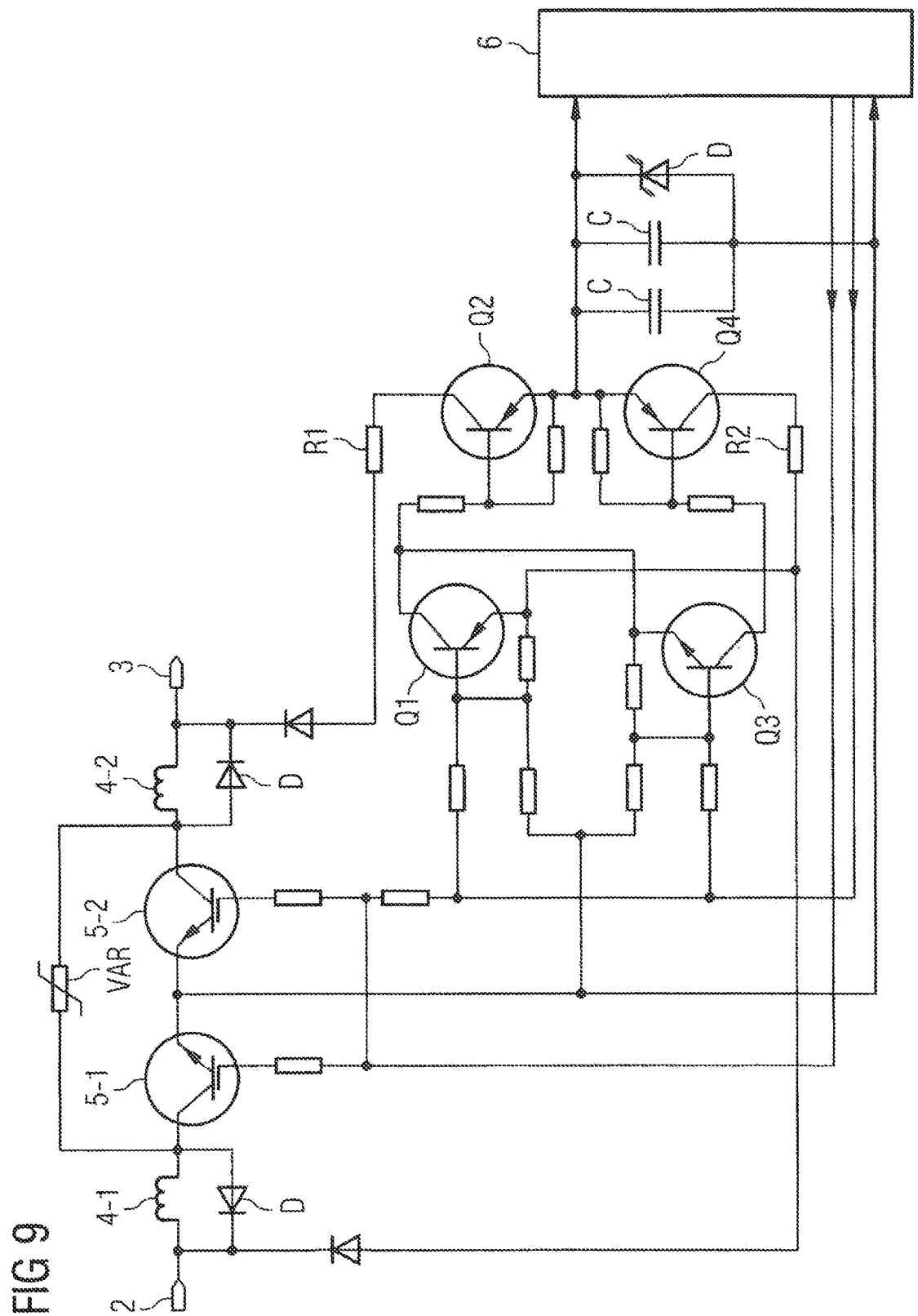
FIG. 9 shows a circuit diagram of a possible exemplary embodiment of an overcurrent protection circuit which can be used in a load protection and control apparatus according to the present invention.
Figure 10:
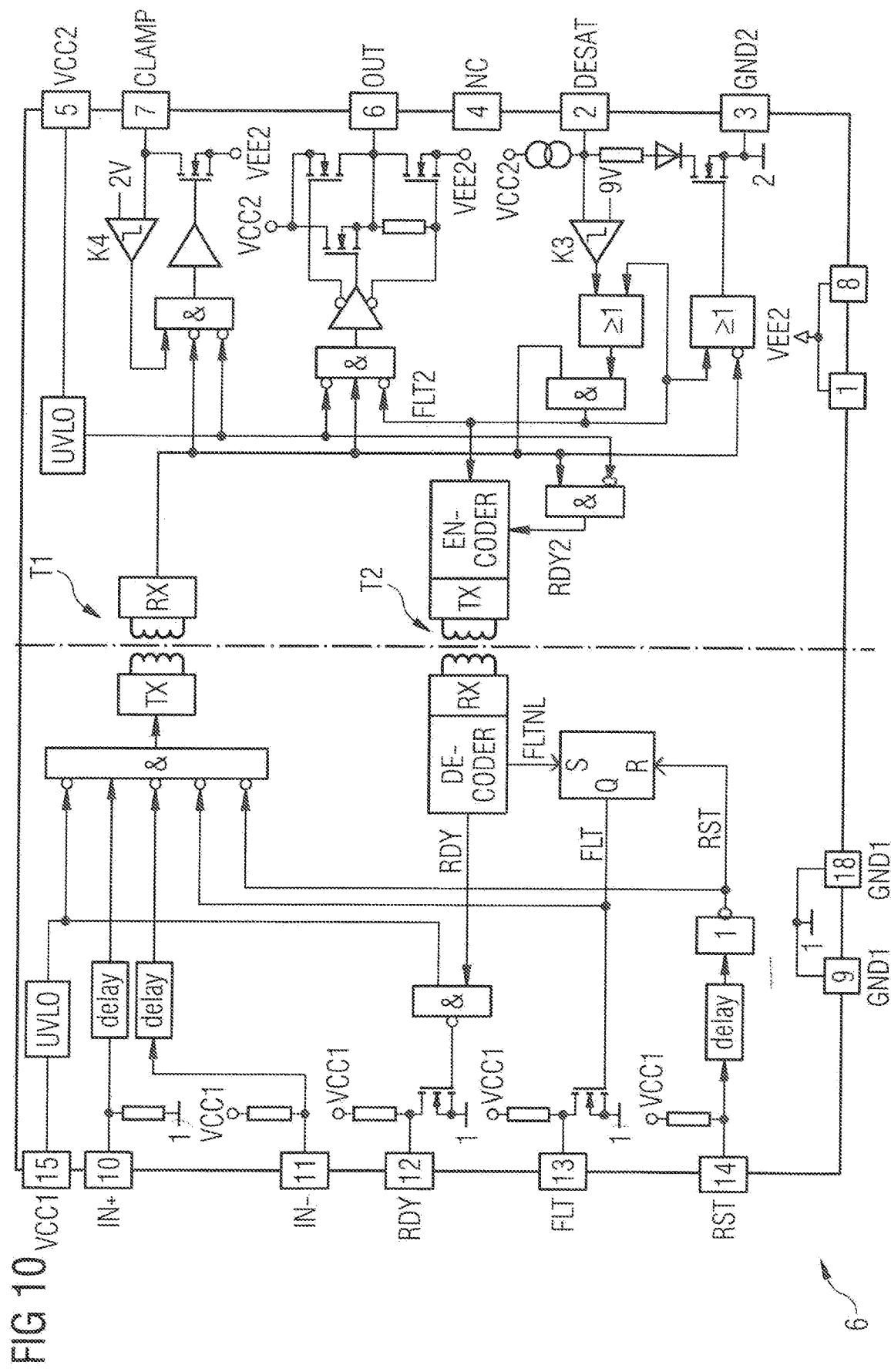
FIG. 10 shows a circuit diagram for illustrating an exemplary implementation of a driver circuit used in a load protection and control apparatus according to the present invention.

As also illustrated in the embodiment shown in FIG. 9, for each electrical current phase L or for each DC current direction, a first power switch 5-1 is provided for a positive current half-wave of an AC current or for a positive DC current. Further, a second power switch 5-2 can be provided for a negative current half-wave of an AC current or for a negative DC current. The power switches 5 can be connected via half-bridge or full-bridge rectifier circuits with associated driver circuits 6 of the load control apparatus 1. As illustrated in FIG. 10, the driver circuit 6 can comprise a low voltage side connected to the control unit 8 and a high voltage side connected to the power switch 5. In a preferred embodiment, the low voltage side and the high voltage side of the driver circuit 6 are galvanically separated from each other.

In a possible embodiment of the load protection and control apparatus 1 according to the present invention, the processor or FPGA 8A of the control unit 8 is adapted to perform a phase angle control and/or to apply a predefined switch pattern to the power switch 5 via the driver circuit 6 depending on the calculated power factor cos φ and a current operation mode of the electrical load connected to the load control apparatus 1. To this end, the processor or FPGA 8A of the control unit 8 has access to at least one load operation characteristic of the electrical load indicating for operation parameters at least one admissible operation zone, at least one critical operation zone and/or at least one inadmissible operation zone.

Figure 5:
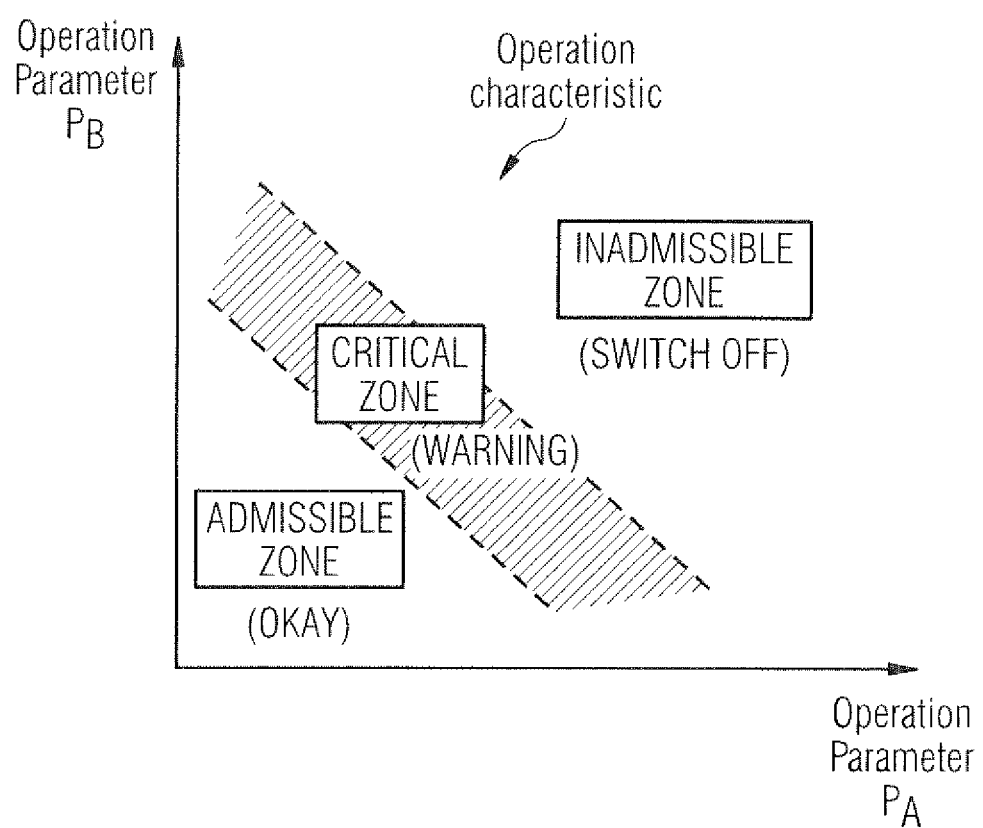
FIG. 5 illustrates schematically possible load operation characteristics of an electrical load connected to a load protection and control apparatus according to the present invention.

FIG. 5 shows schematically a load operation characteristic for an electrical load to provide protection. The different zones of the load operation characteristic can be defined by at least two operation parameters $P_A$, $P_B$ as shown in FIG. 5.

Figure 6:
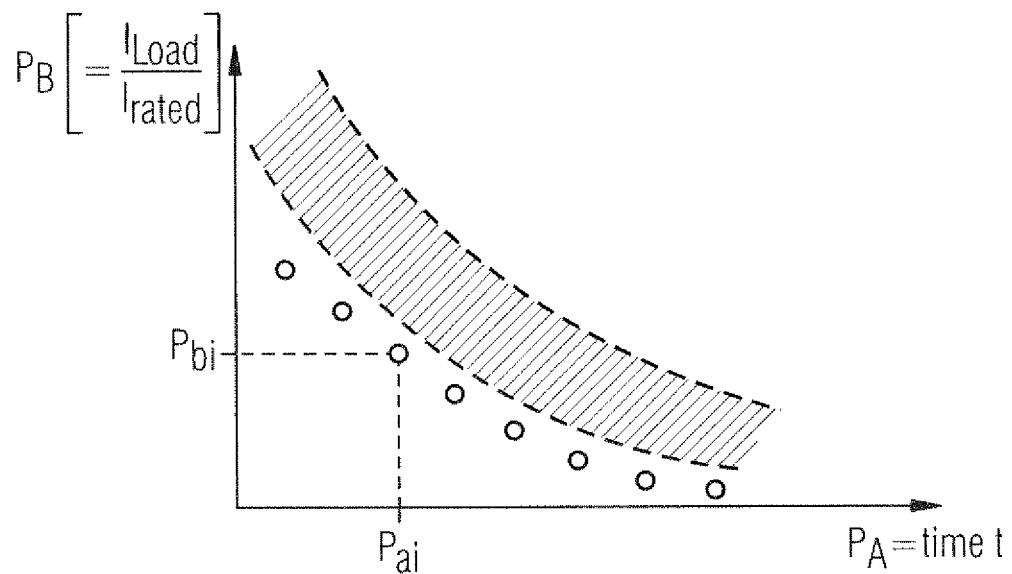
FIGS. 6, 7 show further exemplary load operation characteristics to illustrate the operation of a load protection and control apparatus according to the present invention.
Figure 7:
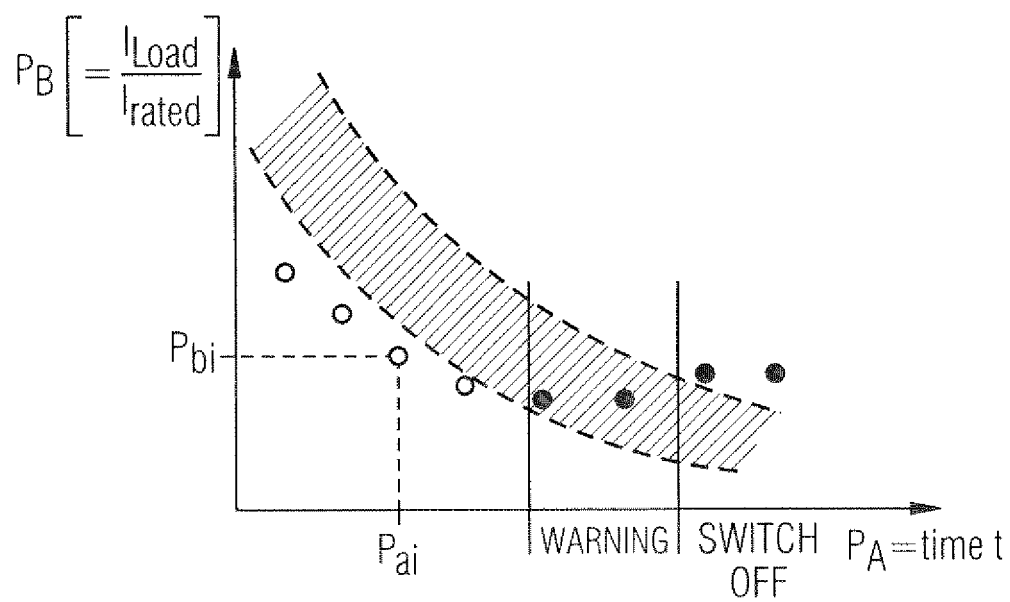

FIGS. 6, 7 show examples of a load operation characteristic which can be stored in a memory 8C of the control unit 8 and used by the processor or FPGA 8A to provide protection of a load, in particular overload protection. As can be seen in FIGS. 6, 7, the processor or FPGA 8A of the control unit 8 is adapted to evaluate load current profile data and/or supply voltage profile data stored in the data memory 8B of the control unit 8 with respect to the load operation characteristics of the electrical load stored in the load characteristic memory 8C to determine whether operation parameter combinations of different operation parameters P are in a critical or inadmissible operation zone of the respective load operation characteristic. In the example shown in FIGS. 6, 7, a parameter $P_B$ given by the ratio between the load current and the rated current of a motor as a load is illustrated over time t to show two different scenarios. In the scenario illustrated in FIG. 6, the calculated ratio between the sampled load current and the predefined rated current provides values which are all in the admissible zone of the load operation characteristic. In contrast, in the scenario shown in FIG. 7, the ratio values (first parameter $P_B$) are initially in the admissible zone and then move in time (second parameter) into the critical zone and finally into an inadmissible zone as shown in FIG. 7. When the parameter $P_B$ reaches the critical zone the control unit 8 can trigger a warning signal. As soon as the operation parameter $P_B$ reaches the inadmissible zone, the processor 8A of the control unit 8 can trigger a switch-off operation mode where the power switch 5 is switched off by the driver circuit 6 in response to a control command received from the control unit 8. Alternatively, the control unit 8 may control another switch connected in series to the power switch 5 to switch off the load in case that an inadmissible operation zone is reached. In a possible embodiment, the control unit 8 can output a warning signal via an output interface 13 of a user data interface 17 of the load control apparatus 1 as shown in FIG. 2 if an operation parameter combination of the operation parameters is determined to be in a critical operation zone of a load operation characteristic of the respective electrical load. Further, the control unit 8 can generate automatically a switch-off control signal applied to the power switch 5 or to another switch (e.g. relay circuit 25) to switch off the load current $I_L$ if an operation parameter combination of operation parameters is determined to be in an inadmissible operation zone of a load operation characteristic of the respective electrical load. In a possible embodiment, different load operation characteristics for different operation parameter combinations can be stored in the memory 8C of the control unit 8.

In a possible embodiment, the control unit 8 of the load control apparatus 1 is adapted to determine whether the received supply voltages received from busbars 14 of the busbar system at different input terminals 2 provided for different phases L indicate a symmetrical power supply by the power supply network PSN connected to the input terminals 2 of the load control apparatus 1 on the basis of the supply voltage profile data stored in the data memory 8B of the control unit 8. The control unit 8 is adapted to switch off automatically the power switches 5 at the different phases L if an unsymmetrical power supply of the power supply network PSN is recognized by the control unit 8.

Figure 4:
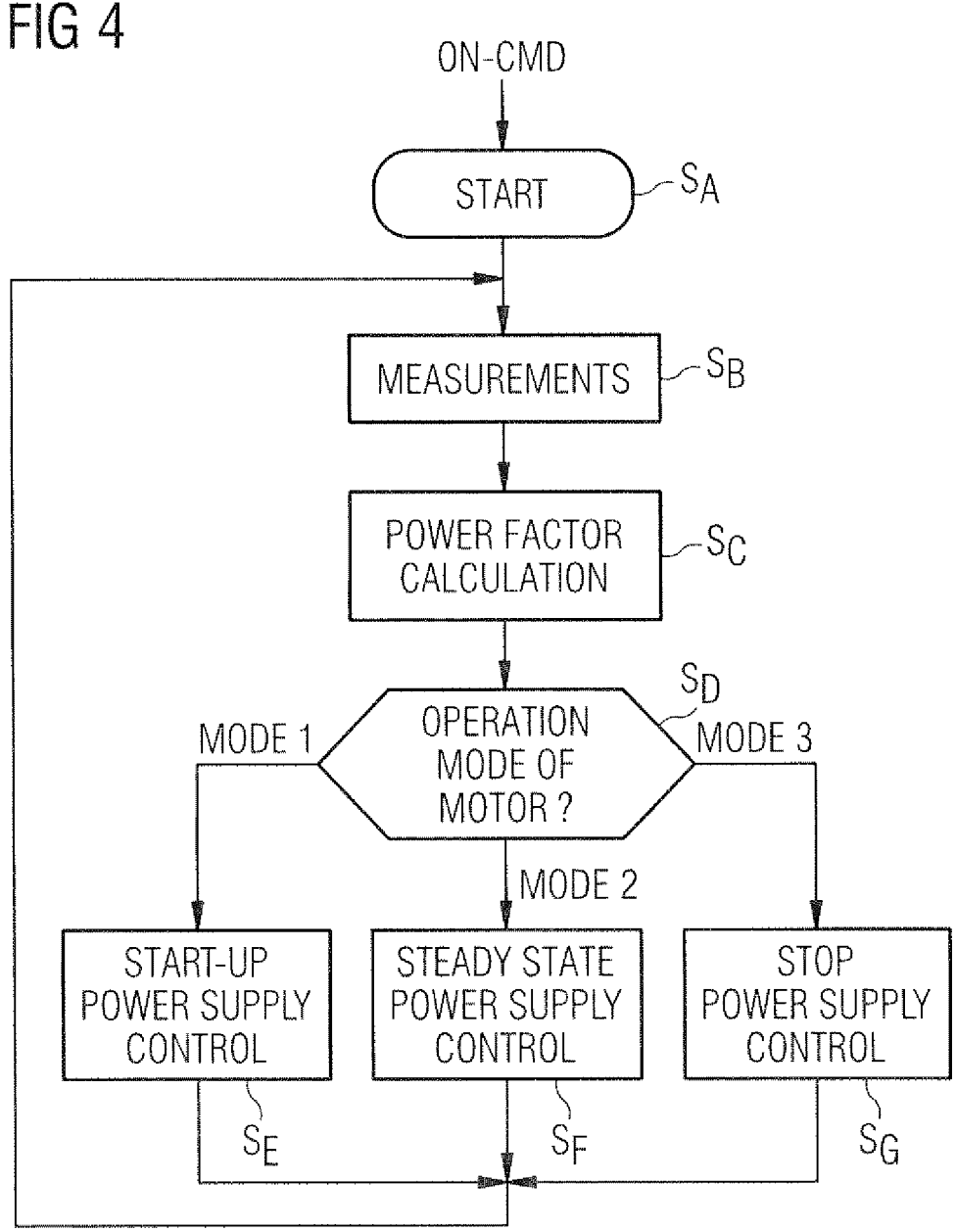
FIG. 4 shows a flowchart for illustrating a possible exemplary embodiment of a load protection and control apparatus according to the first aspect of the present invention.

FIG. 4 shows a flowchart to illustrate a possible exemplary embodiment of the operation of a load control apparatus 1 according to the present invention. In response to an on-command, the connected electrical load is a motor M which is started in step $S_A$ and a transition is performed from the idle operation mode to the start operation mode.

In a first step $S_B$, measurements are performed by sensor components. For each phase L, the respective voltage U and an electrical load current $I_L$ can be measured in step $S_B$. The load current $I_L$ is measured by a sensor component 7 and the supply voltage U can be measured by the sensor component 9 of the load control apparatus 1.

In a further step $S_C$, a power factor calculation is performed by the processor or FPGA 8A of the control unit 8. The processor or FPGA 8A of the control unit 8 is adapted to calculate the power factor cos φ on the basis of the load current profile data and the supply voltage profile data stored in the data memory 8B of the control unit 8. The power factor is defined as a ratio of real power to apparent power. As power is transferred along a transmission line it does not consist purely of real power that can do work once transferred to the electrical motor M but rather consists of a combination of real and reactive power called apparent power. The power factor describes the amount of real power transmitted along a transmission line to the connected electrical load relative to the total apparent power flowing in the transmission line.

In a further step $S_D$, the current operation mode of the electrical motor M is observed. If the started electrical motor M is in the start-up operation mode (mode 1), the processor or FPGA 8A or controller of the control unit 8 performs a start-up power supply control in step $S_E$. If the electrical motor M is in the steady-state operation mode (mode 2), the processor or FPGA 8A of the control unit 8 performs a steady-state power supply control in step $S_F$. If the connected electrical motor M is in the stop operation mode (mode 3), the processor or FPGA 8A or controller of the control unit 8 performs a stop power supply control in step $S_G$ as illustrated in FIG. 4. In a possible implementation, the processor or FPGA 8A of the control unit 8 can perform in step $S_E$, $S_F$, $S_G$ a phase angle control depending on the power factor cos φ calculated in step $S_c$ and the observed current operation mode of the electrical motor M.

A phase angle control (also called phase-fired control PFC) is used for power limiting the applied AC voltage. In a possible embodiment, the control unit 8 operates the power switch 5 to perform phase angle control. The relation between the load current $I_L$ and the supply voltage can be varied by the control unit 8 by controlling the switching of the power switch 5 via the driver circuit 6. In a possible embodiment, the control unit 8 can perform a load soft start procedure to temporarily reduce the mechanical load and torque in the power train to minimize an electrical current surge of an electrical load during a startup. In this way, the control unit 8 may reduce the mechanical stress of the electrical load. The control unit 8 can control in a possible embodiment the three-phase voltage supply of a load during a start-up phase. In this way, the equipment of an electrical load such as a motor can be accelerated smoothly. This lengthens the service lifetime of the electrical load and improves its operation behavior. The control unit 8 can use the solid-state power switch 5 to control the electrical current flow and consequently the voltage applied to the electrical load depending on the calculated power factor and the operation mode and/or type of the electrical load.

Figure 8:
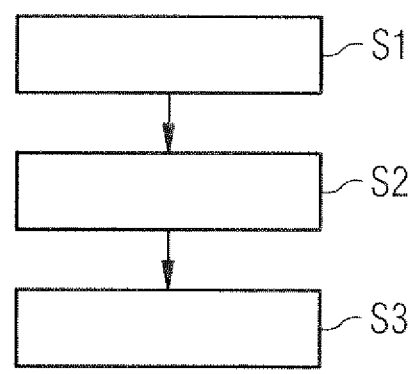
FIG. 8 shows a flowchart for illustrating a possible exemplary embodiment of a method for controlling a power supply to an electrical load according to a further aspect of the present invention.

FIG. 8 shows a flowchart of a possible exemplary embodiment of a method for controlling a power supply to an electrical load according to a further aspect of the present invention.

In the illustrated embodiment of FIG. 8, the method comprises three main steps S1, S2, S3. In a first step S1, a voltage drop $\Delta U_4$ at the sensor component 4 corresponding to a current rise speed of an electrical load current $I_L$ flowing via the sensor component 4 and the power switch 5 to an electrical load is generated. In a possible implementation, the voltage drop $\Delta U_4$ is generated by a coil corresponding to the current rise speed of the electrical load current $I_L$.

In a further step S2, the power switch 5 is automatically switched off by a driver circuit 6 within a switch-off period of less than five microseconds if the generated voltage drop $\Delta U_4$ plus a voltage drop $\Delta U_5$ along the power switch 5 exceeds a threshold voltage to provide protection against an overcurrent, in particular protection against a short circuit current.

In a further step S3, the electrical power applied to the electrical load is controlled by a control unit 8 on the basis of a measured load current profile and a measured supply voltage profile. The electrical power applied to the electrical load can be controlled in a possible embodiment by performing a phase angle control. In an alternative embodiment, the power supply control can be achieved by applying a predefined switching pattern to the power switch 5.

Further, an overload state of the electrical load can be determined on the basis of the measured load current profile by the control unit 8 to trigger a switch-off by the driver circuit 6. In a possible embodiment, a type of the connected load is determined by the control unit 8 based on the measured profile data.

As can be seen from FIG. 2, the hardware sensor component 4 is connected in series with the power switch 5. The hardware sensor component 4 such as a coil is adapted to generate an electrical voltage corresponding to a current rise speed of the electrical current flowing via the sensor component 4 and the power switch 5 to the electrical load connected to the output terminal 3 of the load control apparatus 1. The driver circuit 6 is adapted to detect an occurring overcurrent, in particular a short circuit current, depending on the voltage drop generated directly by the sensor component 4 and to switch off the power switch 5 automatically upon detection of an overcurrent within a very short period of time to protect the connected electrical load. The sensor component 4 comprises in a possible implementation a coil which is adapted to generate directly an induction voltage $U_L$ depending on a change of the electrical current I flowing through the sensor component 4 and through the power switch 5 to the connected electrical load. The induction voltage $U_L$ generated by the coil 4 corresponds to the current rise speed dI/dt of an electrical current I flowing via the sensor component 4 and via the power switch 5 to the respective electrical load. The voltage drop $\Delta U_4$ generated by the sensor component 4 and the voltage drop $\Delta U_5$ along the power switch 5 is applied as a sum voltage $U_\Sigma$ to the driver circuit 6. In case that the power switch 5 is implemented by a MOSFET, the voltage drop $\Delta U_5$ along the power switch 5 corresponds to the drain source voltage $U_{DS}$. The sensor component 4 does not only measure the current rise speed dI/dt but also provides protection of the power switch 5 by limiting the voltage drop $\Delta U_5$, e.g. the drain source voltage $U_{DS}$ of the MOSFET 5. The driver circuit 6 is adapted to determine based on the applied sum voltage $U_\Sigma$ an occurring short circuit current and/or an overload of the power switch 5 and/or an overload of the electrical load and is adapted to switch off the power switch 5 upon detection of an overcurrent and/or upon detection of an overload to protect both the connected electrical load and/or to protect the power switch 5 of the load control apparatus 1 within a short switch-off period of less than five microseconds. In a preferred embodiment, the driver circuit 6 can switch off the power switch 5 within a switch-off period of less than two microseconds if the applied sum voltage $U_\Sigma$ exceeds a predetermined threshold voltage $U_{TH}$. In a possible implementation, the threshold voltage $U_{TH}$ can be configurable. If the applied sum voltage $U_\Sigma$ exceeds the configured threshold voltage $U_{TH}$, the driver circuit 6 of the load control apparatus 1 does switch off automatically the power switch 5 within a short switch-off period of less than five microseconds, preferably with a period of less than two microseconds. The switch-off is performed hardwired without involving the control unit 8. In a possible embodiment, the sensor component 4 comprises a coil adapted to measure the current rise speed dI/dt of the electrical current I flowing via the sensor component 4. The sensor component 4 generates directly an induction voltage $U_L$ proportional to the change of the electrical current (dI/dt) flowing through the coil 4. In a possible embodiment, if the electrical current I has a current rise speed of around five Ampere per microsecond, the generated induction voltage $U_L$ applied to the driver circuit 6 is sufficient to trigger a switch-off operation of the power switch 5 connected in series with the sensor component 4. The inductivity L of the coil 4 can be adapted individually to the physical limitations of the used power switch 5. The hardware sensor component 4 is very robust against environmental influences and does not involve any electronic circuits to generate the sense voltage $\Delta U_4$. Consequently, the probability that the hardware sensor component 4 fails during operation of the load control apparatus 1 is very low. In contrast to electronic circuits such as differentiators, the use of a hardware sensor component, in particular a coil, makes the load control apparatus 1 extremely robust and increases its operation lifetime. Switch-off operations are performed by the driver circuit 6 without involving the relative slow control unit 8. Accordingly, the switch-off operation triggered by the electrical voltage $\Delta U_4$ generated physically by the sensor component 4 is performed exclusively by hardware of the driver circuit 6 as illustrated also in the circuit diagram of FIG. 10. The sensor component 4 is very sensitive and generates a sense voltage $\Delta U_4$ even before the electrical load current $I_L$ flowing to the electrical load reaches a high current level which potentially can damage components of the connected electrical load. Accordingly, the load control apparatus 1 comprises a protection mechanism which is faster by at least a factor of about 50 than conventional protection devices. The very fast switch-off operation provided by the hardware driver circuit 6 does guarantee that only a small protection of electrical energy is transferred to the connected electrical load in case of an overcurrent or short current scenario. Accordingly, even sensitive electrical components of the connected electrical load are protected efficiently by the protection mechanism of the load control apparatus 1 according to the present invention. The protection mechanisms of the load control apparatus 1, i.e. the overcurrent protection circuit 1A and the overload protection circuit 1B, do not only protect the electrical components of the connected electrical load but also the power switch 5 integrated in the load control apparatus 1. Accordingly, the load protection and control apparatus 1 according to the present invention has an integrated self-protection mechanism to provide self-protection of components integrated in the load protection and control apparatus 1. The electrical power at the power switch 5 is limited in a possible implementation to around 80% of a predetermined operation power.

After the power switch 5 has been switched off, it is possible to switch on the power switch 5 again in case that predetermined switch-on conditions have been fulfilled. After a successful clearance of the switch-off cause, the power switch 5 can be switched on again. Consequently, the load protection and control apparatus 1 according to the present invention can be used again after a switch-off has been triggered. In a possible implementation, the power switch 5 can be switched on again after a configurable wait period has expired and/or after successful clearance of a switch-off cause has been achieved.

In a possible implementation, the microprocessor or processor or FPGA 8A of the control unit 8 can calculate a current operation state of the power switch 5, in particular a current dissipation power and/or operation temperature T of the power switch 5. The control unit 8 can issue in a possible implementation a preemptive alarm in case that the monitored power of the power switch 5 or the temperature T of the power switch 5 does exceed admissible limits. The control unit 8 may observe a change of the power and temperature of the power switch 5 and can trigger a switch-off in case that a critical range has been reached.

The applied current phase L can comprise a frequency of e.g. 50 Hz or 60 Hz. In a possible embodiment, the sensor component 4 can comprise a coil with an inductivity L of less than 1 millihenry.

In a possible embodiment, the processor or FPGA 8A of the control unit 8 is programmable and can make use of a program model of components implemented in the connected electrical load and/or implemented in the load control apparatus 1 itself. In a possible embodiment, model parameters of the employed model can be configured. These parameters can for instance comprise the normal operation current of the connected electrical load as well as a tripping class of the connected electrical load. In a possible embodiment, the control unit 8 is adapted to derive based on the current profiles measured by the current measurement component 7 and based on at least one parameter of the connected electrical load a temperature profile of components of the connected electrical load and/or of components of the load control apparatus 1 and may control the driver circuit 6 to switch off the power switch 5 if a deviation from a predetermined temperature range is detected. A parameter can e.g. comprise a set current or a tripping class of the connected electrical load. Further, the control unit 8 can be programmed with a configurable wait period. For instance, depending on the temperature profile, a corresponding wait period has to be expired before the power switch 5 can be switched on again. The driver circuit 6 can operate independently from the control unit 8 to switch off the associated power switch 5 within a brief reaction time in case that the applied sum voltage $U_\Sigma$ exceeds a configurable threshold voltage $U_{TH}$. The voltage drop $\Delta U_5$ along the power switch 5 corresponds to the amplitude or level of the flowing electrical current. The voltage drop $\Delta U_4$ along the sensor component 4 corresponds to the current rise speed of the electrical current flowing via the sensor component 4 and the power switch 5 to the electrical load. In critical operation states, both voltage drops $\Delta U_4$, $\Delta U_5$ are added and applied as a sum voltage $U_\Sigma$ to the driver circuit 6 so that a critical operation state can already be detected in an initial phase of its occurrence. The application of a sum voltage $U_\Sigma$ to the integrated driver circuit chip 6 is illustrated in the circuit diagram of FIGS. 9, 10 requires only one input pin of this chip, thus promoting miniaturization of the load control apparatus 1.

The driver circuit 6 can control an associated power switch 5 which can comprise in a possible implementation a gallium nitride MOSFET having a high voltage endurance of at least 800 Volts in the switch-off state and having a low impedance in its switch-on state. In further possible implementations, the power switch 5 can also comprise a SiC power MOSFET or a SiAlN MOSFET.

Figure 11:
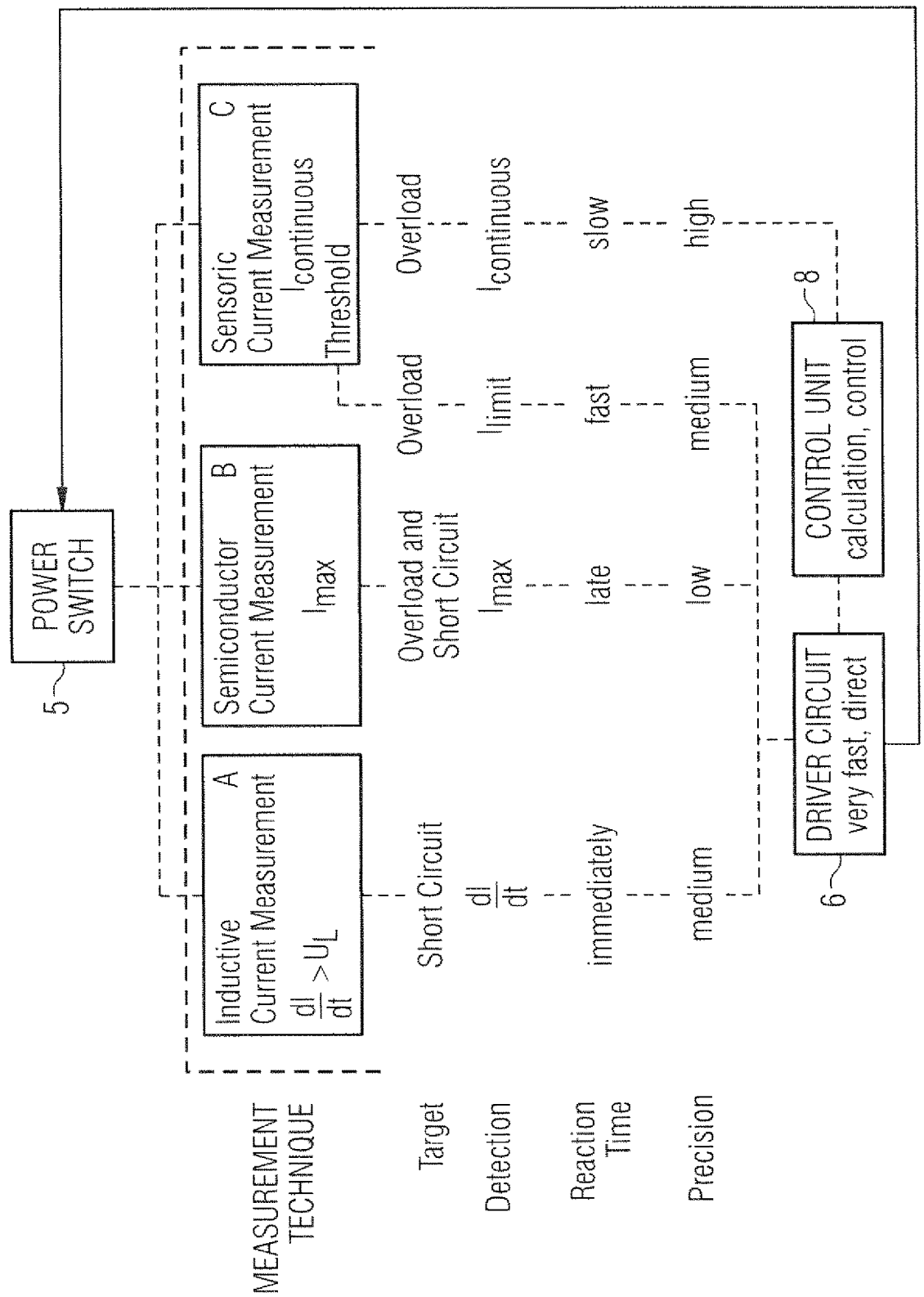
FIG. 11 shows schematically possible different redundant measurement and protection mechanisms employed by a method and apparatus according to the present invention.

As also illustrated in FIG. 11, the load protection and control apparatus 1 can comprise several redundant protection mechanisms using different measurement techniques.

The load protection and control apparatus 1 can comprise several protection mechanisms, in particular a first protection mechanism provided by the voltage drop $\Delta U_4$ along the sensor component 4, a second protection mechanism provided by the voltage drop $\Delta U_5$ along the power switch 5 and a third protection mechanism provided by the current measurement component 7. In case of a short circuit current, the sensor component 4 and the power switch 5 trigger the driver circuit 6 to perform a very fast switch-off operation. The current measurement component 7 further provides protection in case of overload. Accordingly, the load protection and control apparatus 1 not only provides control of a power supply to an electrical load but also an electronic overload and overcurrent protection which can be used again after the power switch 5 has been switched off, in particular after a programmable wait period has expired.

FIG. 9 shows a circuit diagram for illustrating a possible exemplary implementation of a load protection and control apparatus 1 providing switching and/or protection of an electrical load connected to the load control apparatus 1. In the illustrated implementation, the load control apparatus 1 comprises an input terminal 2 to receive a phase supply voltage U directly from a busbar 14 or via a busbar adapter 18A from a power supply network PSN having e.g. a voltage of 400 Volts. In the illustrated exemplary embodiment of FIG. 9, each signal path from the input terminal 2 to the output terminal 3 comprises pairs of power switches 5 and associated sensor components 4. The illustrated circuit of FIG. 9 is symmetrical for positive current half-waves and negative current half-waves of an AC current supplied to the load control apparatus 1. Between the input terminal 2 and the output terminal 3 of the load protection and control apparatus 1, a first coil 4-1 and a second coil 4-2 are provided. Each coil 4-1, 4-2 comprises an associated power switch 5-1, 5-2 as illustrated in the circuit diagram of FIG. 9. In the illustrated exemplary implementation, both coils 4-1, 4-2 have an inductivity L of 2.2 microhenry. In the illustrated implementation, the power switches 5-1, 5-2 are implemented by power MOSFETs. A varistor VAR can be provided in a possible implementation to eliminate disturbances. In the illustrated implementation, diodes D can be connected in parallel to each coil 4-1, 4-2 to reduce self-induction. The power switches 5-1, 5-2 are connected to a bridge rectifier circuit comprising in the illustrated implementation two pairs of complementary transistors Q1 to Q4. At the output side of the bridge rectifier circuit, capacitors C can be provided to provide a predetermined minimal delay. Both resistors R1, R2 comprise a resistance which can be configured to adjust the sensitivity of the circuit illustrated in FIG. 9. As can be seen in FIG. 9, the driver circuit 6 is connected to the output of the bridge rectifier circuit to receive the sum voltage $U_\Sigma$ of power switch 5-1 or power switch 5-2 and sensor component 4-1 or sensor component 4-2 and to apply in return control voltages on the gates of the two illustrated power switches 5-1, 5-2. The driver circuit 6 is adapted to detect an occurring overcurrent, in particular a short circuit current, depending on the voltages generated directly by the sensor component 4-1 or the sensor component 4-2 and to switch off the associated power switch 5-1 or power switch 5-2 upon detection of a short circuit current flowing through the current path between input terminal 2 and output terminal 3 within a period of time, in particular within a switch-off period of less than five microseconds, to protect the electrical load connected to the output terminal 3 of the load control apparatus 1.

The switch-off period is defined by the connection circuitry connecting the sensor components 4 with the driver circuit 6 as shown in FIG. 9 (in particular capacity of capacitor C) and the inner circuitry of the hard-wired driver circuit 6, i.e. the signal propagation delays caused by the comparator and gates of the driver circuit 6 as shown in FIG. 10. With the driver circuit 6 shown in FIG. 10, a switch-off period of less than five microseconds can be achieved.

In a possible embodiment the switch-off period is adjustable, e.g. by adjusting the capacity of capacitor C shown in FIG. 9.

FIG. 10 shows a block diagram of a possible exemplary embodiment of a driver circuit 6 which can be used in the load protection and control apparatus 1 according to the present invention. In the illustrated exemplary embodiment, the driver circuit 6 comprises a single IGBT driver ICIED020/12-B2 manufactured by Infineon Technologies. Other driver circuits may also be used, in partial an ASIC. As can be seen from the block diagram of FIG. 10, the driver circuit 6 comprises two separated circuit halves galvanically separated by transformers T1, T2. The left side of the driver circuit 6 illustrated in FIG. 10 is connected to the control unit 8 to receive control signals from the control unit 8, in particular in response to control commands or depending on measured current profiles. The low voltage side on the left side of the driver circuit 6 of the circuit diagram as shown in FIG. 10 is connected via transformers to the high voltage side provided on the right side of the illustrated circuit of FIG. 10. The sum voltage $U_\Sigma$ consisting of the voltage drop $\Delta U_4$ along the sensor component 4 and the voltage drop $\Delta U_5$ along the power switch 5 is applied in the illustrated implementation to the DESAT input pin of the driver circuit 6 and is compared by a comparator K3 of the driver circuit 6 with a configurable threshold voltage $U_{TH}$ of e.g. 9 Volts as illustrated in FIG. 10. If the configurable threshold voltage $U_{TH}$ is exceeded, a binary signal travels through several gates to drive an operational amplifier and to generate a control switch-off signal output to the gates of the power MOSFETs 5-1, 5-2 to switch both power MOSFETs off within a very short reaction time of less than five microseconds. The driver circuit 6 illustrated in FIG. 10 comprises two galvanically separated parts. The driver circuit 6 can be connected to a standard 5 Volt DSP or microcontroller 8A forming part of the control unit 8 wherein CMOS inputs/outputs are connected to the low voltage side. As can be seen from the circuit diagram of FIG. 10, a switch-off loop used to switch off the power switches 5-1, 5-2 in response to the applied sum voltage $U_\Sigma$ is provided only at the high voltage side of the driver circuit 6 so that the reaction time is very short because of the small propagation times of the logical signals propagating via the logical gates of the high voltage part of the driver circuit 6. The switch-off protection loop does not include the control unit 8 which is mostly used for normal switching and/or switching-off operations in response to receive switched-on/switched-off commands CMD and is also used for the power supply control of the electrical power flowing to the connected electrical load, in particular during a soft start up. In a possible implementation, the sensor component 4 and the power switch 5 as well as the driver circuit 6 can be provided on a common printed circuit board. In a possible embodiment the driver circuit 6 can be integrated in the control unit 8.

In a possible implementation, the sensor component 4 can be implemented by another component than a coil, in particular by a resistor with a corresponding local measurement circuit adapted to generate directly an electrical voltage U corresponding to the current rise speed of the electrical current I flowing through the respective sense resistor. The resistor can be an NTC or PTC resistor. In a possible embodiment, the resistance of the used resistor 4 can be temperature-dependent. Also, the temperature-dependent resistance can be configured individually to the physical limitations of the associated power switch 5.

In a further embodiment, a data model of the connected electrical load can be stored in a memory and evaluated by the processor or FPGA 8A of the control unit 8 to provide overload and/or overcurrent protection to the connected electrical load. The load protection and control apparatus 1 can comprise an output interface 13 of a user or data interface 17 adapted to signal a current operation state of the load protection and control apparatus 1, in particular of its integrated power switches 5 to a user or to a connected controller, e.g. a controller of an automation system. In a possible implementation, the user interface 13 can also indicate what safety mechanism or protection mechanism has been triggered by the switching-off of the integrated power switches 5. In this implementation, a user or operator of an automation system can be informed whether the switching-off of the power switch 5 was caused by a detected high current rise speed of the electrical current or because of a determined or detected overload of the power switch 5 or detected overload of the connected electrical load or caused by an overload detection in view of the current profiles measured by the current measurement component 7. In a still further possible embodiment, information about the cause of the switching-off of the power switch 5 can also be output via a data interface of the load protection and control apparatus 1, for instance to a remote controller of an automation system including the protected electrical load connected to the output terminal 3 of the load protection and control apparatus 1. In a still further possible implementation, the load control apparatus 1 can comprise a local data memory to store log data. The log data can comprise data about switch-off operations performed during operation of the automation system or during operation of the connected electrical load. In a possible implementation, the memorized log data can be evaluated to analyze critical operation states having occurred during operation of the automation system.

In a still further possible embodiment as shown in FIG. 2, a relay circuit 25 can be connected in series with the power switch 5. The relay circuits 25 for different phases L can use the change or sequence of power supply phases and/or provide a galvanic separation. During a switch-off operation controlled by the driver circuit 6 or by the control unit 8, the power switch 5 can be switched off before the associated relay circuit 25, whereas during a switch-on operation under control of the driver circuit 6 or under control of the control unit 8 the relay circuit 25 is switched on before the associated power switch 5. This does minimize the contact wear of the relay circuit 25 and increase the safety against failure of the power switch 5. Further, the switch-on and switch-off sequences make it possible to detect failures of the power switch 5.

In a still further possible embodiment of the load protection and control apparatus 1 according to the first aspect of the present invention, different models and/or load operation characteristics for different electrical loads can be uploaded to a configuration memory of the control unit 8 to provide matching load protection for the respective electrical load depending on the measured current profiles and/or voltage profiles and depending on at least one parameter of the connected electrical load. In a possible implementation, these data models can be downloaded from a central database connected to the control unit 8 via a data network. Depending on the type of the connected electrical load, different corresponding data models and/or load operation characteristics can be loaded into the operation characteristics memory 8C of the control unit 8 and can be evaluated in view of the measured current and/or voltage profiles provided by the measurement components.

FIG. 11 shows schematically the operation architecture of the load protection and control apparatus 1 comprising redundant protection mechanisms and different measurement techniques to provide overload and/or overcurrent protection of the load control apparatus 1 itself, in particular its power switches 5, and also for the electrical load connected to the load control apparatus 1. Different redundant protection mechanisms differ in what they detect (dI/dt, $I_{max}$, $I_{limit}$, $I_{continuous}$), their respective reaction times and the measurement precision as also illustrated in FIG. 11. Even if one protection mechanism may fail another protection mechanism of the load control apparatus 1 can still be applied.

The load protection and control apparatus 1 according to the present invention provides for an optimized start operation and switch-off of a connected electrical load. Further, the wearout of the connected electrical load during the different operation phases or states is minimized to maximize the operation lifetime of the electrical load.

The load protection and control apparatus 1 can also be integrated in a fuse housing such as a NH-fuse housing. In this embodiment, the load control apparatus 1 may be used to substitute a conventional fuse element placed in a fuse holder of an electronic circuit. The load protection and control apparatus 1 may also be integrated in a socket component or into a plug component. The load protection and control apparatus 1 can also be integrated into a housing of an adapter device.

Figure 13A:
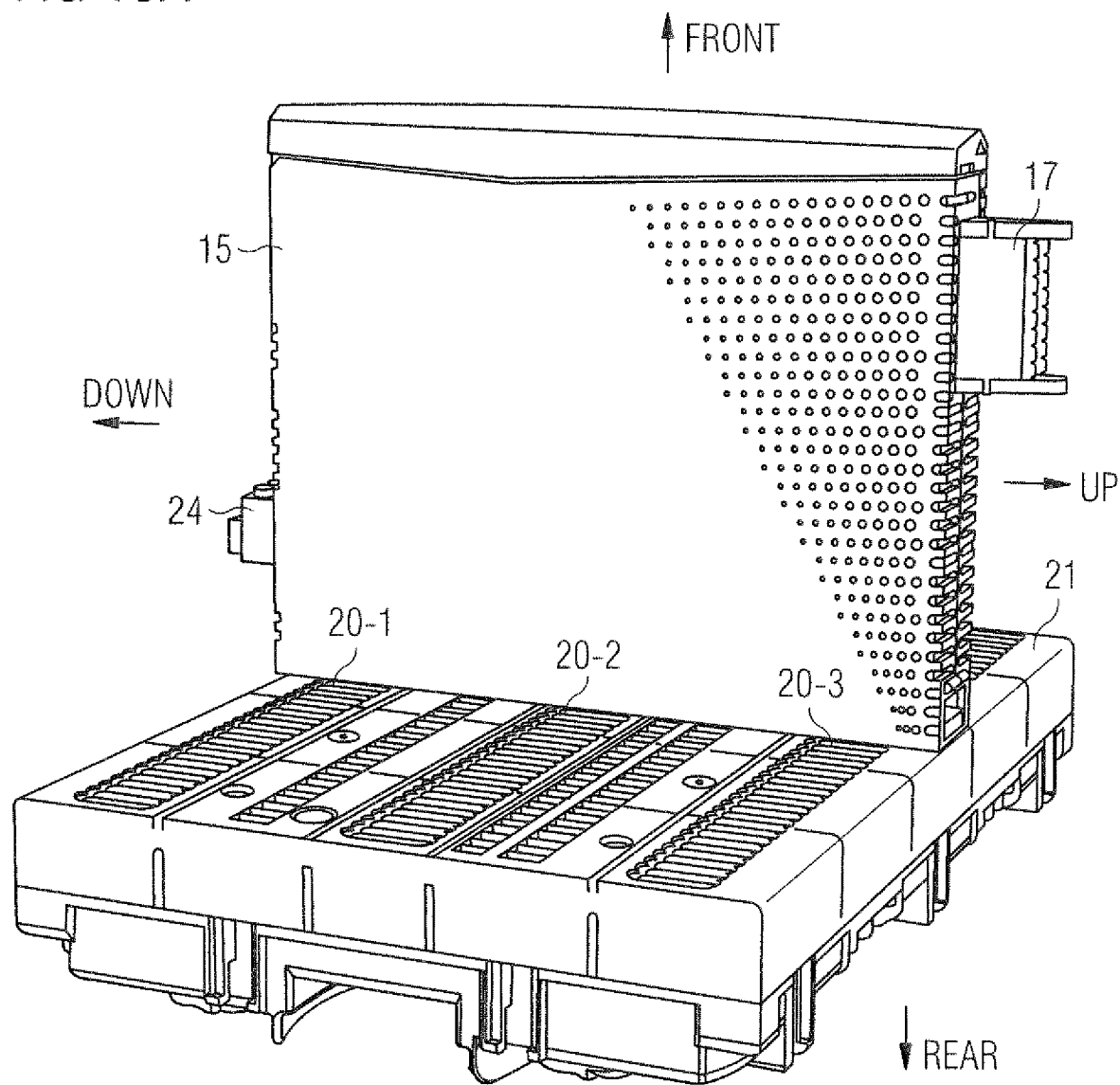
Figure 13B:
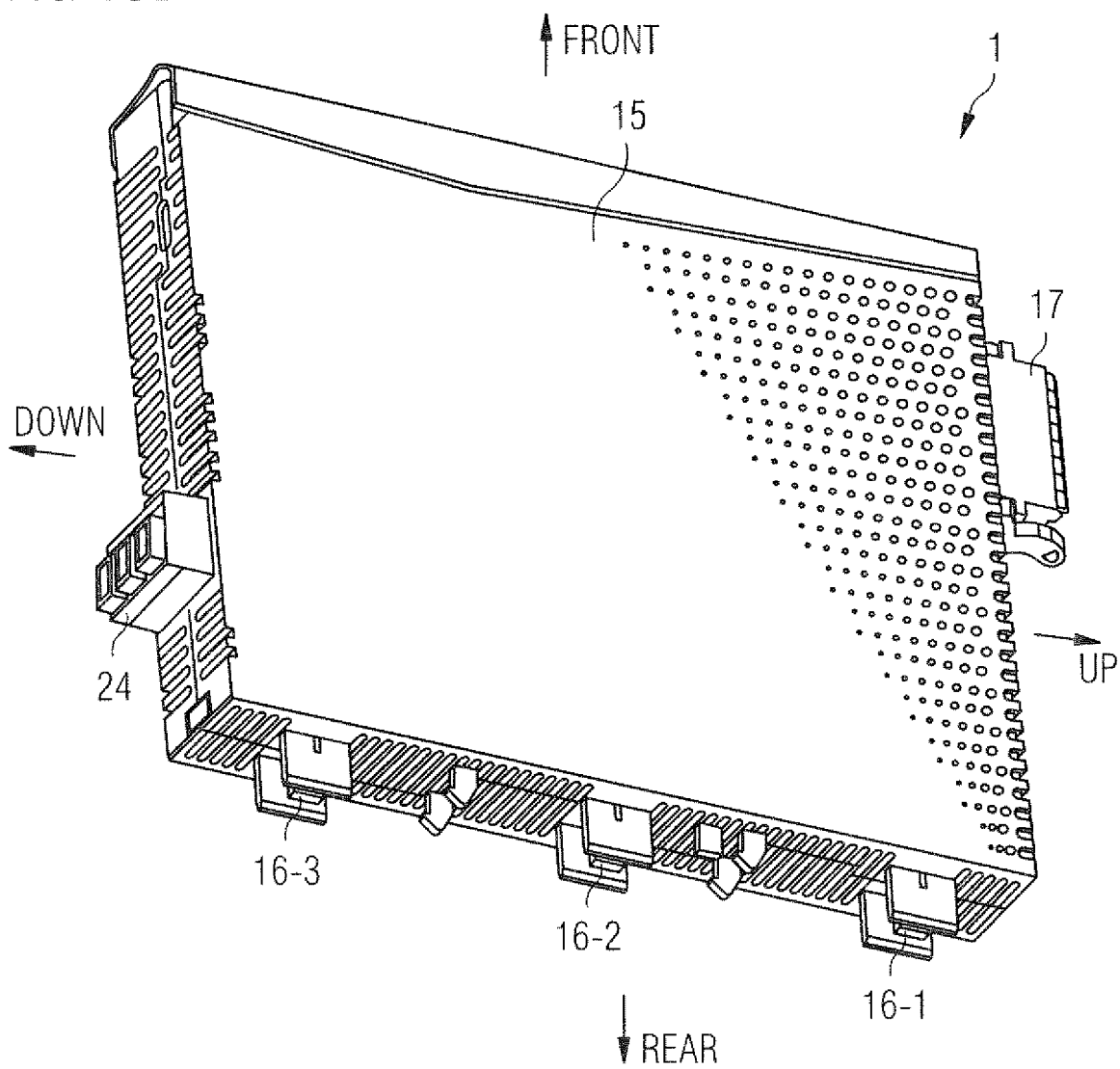

In the illustrated embodiments of FIGS. 12, 13, the load protection and control apparatus 1 according to the present invention is integrated in a housing 15 having at a rear or bottom side electrical contacts 16 (as shown in FIG. 13B) which can be plugged into receiving contact slots 22-$i$ of a corresponding busbar 14-$i$ or of another device, in particular a busbar adapter device 18A as shown FIG. 12A. The protruding electrical contacts 16-$i$ can also be provided with protecting ribs on both sides for mechanical protection. At a side of the housing 15 of the load protection and control apparatus 1, an optional data interface 17 can be provided as shown in FIG. 12B to output an operation state of the connected load and/or of the load control apparatus 1 itself. The load is connected to the load interface 24 including the output terminals 3. The data interface 17 can be provided to exchange data and/or control signals with a connected device. The connected device can comprise a user interface device or a controller of an automation system. the data interface 17 comprises a data input interface 12 and a data output interface 13 as also illustrated in the block diagram of FIG. 2. In a preferred embodiment, the interface 17 is provided at an upper side of the housing 15 in a mounted state as illustrated in the embodiment of FIG. 12B. At the rear side of the housing 15 as shown in FIG. 13B, the protruding electrical contacts 16 provided at the input terminals 2 of the load control apparatus 1 can be plugged into an adapter device 18A having at its rear side hook elements 19 for mounting the busbar adapter 18A to several parallel busbars 14-1, 14-2, 14-3 of the busbar system (FIG. 12A) or to a DIN rail with a DIN rail adapter 18B as illustrated in FIG. 12C. The adapter 18B can also be integrated in the housing 15 of the apparatus 1. The overcurrent protection circuit 1A, the overload protection circuit 1B and/or the power supply control circuit 1C are integrated in the housing 15 of the load control apparatus 1 shown in FIGS. 12, 13. At a side of the housing 15 of the load control apparatus 1 shown in FIGS. 12, 13, the electrical load interface 24 can be provided including the output terminals 3 for connection of an electrical load, in particular an electrical motor M. In a preferred embodiment the busbars 14 can be directed in parallel in a horizontal direction as shown in FIG. 12B one above the other. The latches 19 with hooks engage the busbar 14 from above to carry the housing 15. In this embodiment the load connector 24 is at the bottom side (Down) and the data interface 17 is at the top side (Up). The slot 23 for receiving a data carrier can be at the downside.

In a possible embodiment, the protruding electrical contacts 16-$i$ provided at the bottom side of the housing 15 of the load control apparatus 1 as shown in FIG. 13B can be guided through guide openings 20-1, 20-2, 20-3 of a touch-safe protection cover 21 as shown in FIGS. 13A, 14A. The touch-safe protection cover 21 covers in a possible embodiment busbars 14-$i$ visible in FIG. 14B. The busbars 14-$i$ shown in FIG. 14B are hybrid busbars having matching contact slots 22-1, 22-2, 22-3 lying directly beneath the corresponding contact openings 20-1, 20-2, 20-3 of the protection cover 21 shown in FIG. 14A. As can be seen in FIG. 14A, there are three rows of guide openings 20-$i$ for the three different current phases L1, L2, L3 provided to receive electrical contacts 16-$i$ of devices such as the load protection and control apparatus 1 shown in FIGS. 12, 13. The protruding electrical contacts 16-$i$ at the bottom side of the housing 15 are guided through the equidistant guiding openings 20-$i$ and are inserted into the receiving matching contact slots 22-$i$ of the hybrid busbars 14-$i$ covered by the touch-safe protection cover 21 to establish an electrical connection between the hybrid busbars 14-$i$ of the busbar system and the load protection and control apparatus 1. The protruding electrical contacts 16-$i$ of the load protection and control apparatus 1 can also be inserted into a busbar adapter device 18A as illustrated in FIG. 12A to provide connection to conventional massive busbars 14-$i$ which do not comprise any receiving electrical slots. FIG. 12A illustrates the adapter device 18A for connection to three parallel busbars 14-1, 14-2, 14-3 of the busbar system, FIG. 12B the adapter device 18A is integrated in the housing 15 of the apparatus 1.

FIG. 12C shows a DIN rail adapter device 18B for mounting the load protection and control apparatus 1 to a DIN rail or top hat rail.

There can be different variants of the load protection and control apparatus 1 as illustrated in FIGS. 12, 13.

The interface 17 can include a user interface having an input interface 12 with input elements and/or an output interface 13 with output elements, in particular optical output elements such as LEDs. In a further implementation as shown in FIG. 12B, the housing 15 of the load control apparatus 1 may also comprise at least one user interface element 25 at the front side. A slot 23 for inserting a portable data memory 8B and/or a portable load characteristics memory 8C such as an USB stick or a memory card accessed by the processor or FPGA 8A of the control unit 8 can be provided at the downside in the mounted state as shown in FIG. 12D. In the illustrated embodiment of FIG. 12D the slot 23 is provided for inserting a portable memory into the housing 15 of the load protection and control apparatus 1 from the downside when the apparatus 1 has been mounted to three massive busbars 14 extending in parallel in horizontal direction or by means of an adapter device 18B to a DIN rail as shown in FIG. 12D. In the embodiment of FIGS. 12B, 12D an input key element 30 is provided to perform user input via input interface 12. The input key element 30 can be pressed by a finger of the user. The input element 30 can also comprise an integrated LED indicating an operation state of the apparatus 1 or the connected load.

The form of the housing 15 can vary depending on the use case. In a possible embodiment, the housing 15 corresponds to the housing of a conventional fuse element such as a NH-fuse. In this implementation, the housing 15 can be inserted into a conventional fuse holder already provided on an electronic circuit or on the circuits of a printed circuit board PCB. In a still further alternative embodiment, the housing 15 can also be integrated in a plug component or into a socket of another electronic device. The housing 15 can further comprise mechanical support elements or hooks for providing mechanical support when connected to the busbar system. The housing 15 may also have integrated adapters such as adapter 18A, 18B shown in FIGS. 12A, 12C.

In the embodiment of FIG. 12D a selection input element 27 is provided for selecting functions displayed in a menu shown on a display element 28 of the output interface 13 of the user interface 17. The rail adapter 18B has connectors 29 to receiver current carrying wires providing the supply voltages L1, L2, L3 supplied by the rail adapter 18B to input terminals 2 of the apparatus 1.

A shown in FIG. 12B a busbar interface at the rear side of the housing 15 may also comprise latches 19 which engage massive electrical busbars 14 from behind to provide an electrical and mechanical connection between the load protection and control apparatus 1 and the respective busbars 14. As illustrated in the embodiment of FIG. 1A, several load control apparatuses 1 can be placed in parallel on the busbar system to provide power supply to a multiphase load such as an electrical motor M. The housing 15 can comprise cooling slots to provide convection for cooling elements integrated in the housing 15, in particular the power switches 5 of the load control apparatus 1.

The apparatus 1 can comprise a standalone device integrated in a housing 15. The apparatus 1 can also be integrated in the housing of the load such as in a motor housing. The apparatus 1 can also form part of intermediary devices such as frequency controllers. The apparatus 1 can form also an integral component with an adapter.

The housing 15 may comprise an element 26 which can be operated by a tool such as a screwdriver for engaging or disengaging a busbar adapter 18A by the housing 15 as shown in FIG. 12A or to engage or disengage a DIN rail adapter 18B as shown in FIG. 12C.

The number of latches 19 at the rear side of the housing 15 or at the bottom or rear side of an adapter 18A may vary depending on the number of parallel busbars 14 of the busbar system. The distance between the latches 19 or between protruding contacts 16 at the bottom side of the housing 15 or at the bottom side of the adapter 18A depends also on the distance between the busbars 14 of the respective busbar system. Further the size of the latches 19 and the protruding contacts 16 depends on the size and form of the busbars 14 of the busbar system. For massive busbars 14 as shown in FIG. 12A the mechanical connection is provided by latches 19 engaging the busbars 14 from behind. For hybrid busbar 14 as shown in FIG. 14B (covered by a cover 21 or uncovered) the protruding electrical contacts 16 and the protection ribs inserted into the slots 22 provide the mechanical support for the apparatus 1.

The DIN rail adapter 18B shown in FIG. 12D has input connectors 29 adapted to receive electrical wires supplying the supply voltage phases L1, L2, L3 to the adapter 18B into which protruding contacts 16 of the apparatus 1 can be plugged to receive the supply voltage phases via input terminals 2. The rail adapter 18B can also be integrated in the housing 15 of the apparatus 1. Further the load connector 24 and the memory card receiving slot 23 are provided at the downside when the apparatus 1 is mounted by means of the DIN rail adapter 18B to a DIN rail.

The invention claimed is:

1. A load protection and control apparatus for protecting and controlling an electrical load connected to the load protection and control apparatus comprising:
    an overcurrent protection circuit having at least one input terminal wherein each input terminal is configured to establish an electrical connection with a busbar of a busbar system to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a switch-off period of less than one millisecond, wherein the driver circuit comprises a low voltage side connected to control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period of less than one millisecond to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit,
    said load protection and control apparatus further comprising a power supply control circuit having a voltage sensor component adapted to measure at the input terminal a supply voltage notified to the control unit of the load protection and control apparatus to provide a supply voltage profile,
    wherein the control unit is adapted to control an electrical power supplied to the connected electrical load depending on the supply voltage profile and a measured load current profile.

2. The load protection and control apparatus according to claim 1 further comprising:
    an overload protection circuit having a load current sensor component adapted to measure continuously the load current flowing to the output terminal notified to the control unit of the load protection and control apparatus to provide a load current profile, wherein the control unit is adapted to determine an overload state or a type of the connected electrical load on the basis of the measured load current profile, wherein the type of the connected electrical load comprises a resistive, capacitive or inductive electrical load.

3. The load protection and control apparatus according to claim 2 wherein the control unit is adapted to control the driver circuit to switch-off the power switch if an overload state of the connected electrical load is determined by the control unit or to control an electromechanical relay connected in series with the power switch to interrupt the current flow if an overload state of the connected electrical load is determined by the control unit.

4. The load protection and control apparatus according to claim 2 wherein the load current sensor component of the overload protection circuit comprises a Hall sensor, a GMR sensor or a transformer adapted to measure continuously the load current flowing to the output terminal of the load protection and control apparatus to provide the load current profile.

5. The load protection and control apparatus according to claim 2 wherein the load current sensor component of the overload protection circuit and the at least one voltage sensor component of the power supply control circuit are connected to associated analog-to-digital converters adapted to convert the measured analog load current profile and the measured supply voltage profile into corresponding measurement values stored in a data memory of the control unit as load current profile data and supply voltage profile data, wherein a processor or FPGA of the control unit is adapted to calculate a power factor on the basis of the load current profile data and the supply voltage profile data stored in the data memory of the control unit, wherein the processor or FPGA of the control unit is adapted to determine an operation mode of the connected electrical load by processing the load current profile data and the supply voltage profile data stored in the data memory of the control unit.

6. The load protection and control apparatus according to claim 5 wherein the control unit of the load protection and control apparatus is adapted to derive based on at least one operation parameter of the connected electrical load and the profile data stored in the data memory of the control unit a temperature profile of components of the connected electrical load and is adapted to control the driver circuit to switch off the power switch if a deviation of the derived temperature profile from a predetermined temperature range is detected.

7. The load protection and control apparatus according to claim 5 wherein the control unit is adapted to perform a phase angle control or to apply a predefined switching pattern to the power switch depending on the calculated power factor and depending on an operation mode of the connected electrical load.

8. The load protection and control apparatus according to claim 5 wherein the processor or the FPGA of the control unit has access to at least one load operation characteristic of the connected electrical load stored in a load characteristic memory of the control unit indicating for operation parameters at least one admissible operation zone, at least one critical operation zone and at least one inadmissible operation zone, wherein the operation parameters comprise as a first operation parameter a current ratio and as a second parameter time.

9. The load protection and control apparatus according to claim 8 wherein the processor or FPGA of the control unit is adapted to evaluate the load current profile data and the supply voltage profile data stored in the data memory of the control unit with respect to the load operation characteristics of the electrical load stored in the operation characteristics memory to determine whether operation parameter combinations of different operation parameters are in a critical or inadmissible operation zone of the stored load operation characteristic, wherein the control unit outputs a warning signal via an output interface of the load protection and control apparatus if an operation parameter combination of the operation parameters is determined to be in a critical operation zone of the stored load operation characteristic of the connected electrical load and wherein the control unit generates automatically a switch-off control signal applied to the power switch to switch off the load current if an operation parameter combination of operation parameters is determined to be in an inadmissible operation zone of the stored load operation characteristic of the connected electrical load.

10. The load protection and control apparatus according to claim 1 wherein the control unit is adapted to control the electrical power supplied to the connected electrical load depending on an operation mode of the connected electrical load on the basis of the load current profile measured by the load current sensor component of the overload protection circuit and on the basis of the supply voltage profile measured by the voltage sensor component of the power supply control circuit at the input terminal of the load protection and control apparatus.

11. The load protection and control apparatus according to claim 1 wherein the current rise speed sensor component of the overcurrent protection circuit comprises a coil which is adapted to generate an induction voltage drop depending on the current rise speed of the load current flowing through the current rise speed sensor component of the overcurrent protection circuit.

12. The load protection and control apparatus according to claim 1 wherein the power supply control circuit has at least one voltage sensor component formed by a voltage divider adapted to supply a fraction of the supply voltage at the input terminal to the control unit of the load protection and control apparatus to provide the supply voltage profile.

13. The load protection and control apparatus according to claim 1 wherein the control unit is adapted to control the driver circuit of the load protection and control apparatus on reception of a control command such that the power switch is switched either on or off according to the received control command, wherein the control unit of the load protection and control apparatus is adapted to receive the control command from a user interface of the load protection and control apparatus, from a computer connected to said load protection and control apparatus or from a stored program control of an automation system.

14. The load protection and control apparatus according to claim 1 wherein the power switch comprises an IGBT or a power MOSFET, in particular a SiC MOSFET, a GaN MOSFET or a ScAlN MOSFET.

15. The load protection and control apparatus according to claim 1 wherein the power switch is switched on after a configurable wait period or after successful clearance of a switch-off cause or if other predetermined switch-on conditions are fulfilled.

16. The load protection and control apparatus according to claim 1 wherein the connected electrical load receives via the load protection and control apparatus several electric current phases as operation load currents.

17. The load protection and control apparatus according to claim 16 comprising different input terminals provided for different phases received from busbars of the busbar system, wherein each input terminal is connected via a signal path to an output terminal, wherein each signal path comprises pairs of power switches and associated current rise speed sensor components, wherein the pair of power switches provided in the signal path between the input terminal and the output terminal comprises a first power switch provided for a positive current half-wave of an AC current or provided for a positive DC current and a second power switch is provided for a negative current half-wave of an AC current or provided for a negative DC current, wherein control voltages are applied on the gates of the power switches in response to the sum voltage of the first power switch or second power switch and a first current rise speed sensor component or a second current rice speed sensor component received via a bridge rectifier circuit.

18. The load protection and control apparatus according to claim 14 wherein the control unit of the load protection and control apparatus is adapted to determine whether received supply voltages at different input terminals and load currents provided for different phases at different output terminals indicate a symmetrical power supply of the connected electrical load by the power supply network connected via busbars of the busbar system to the input terminals of the load protection and control apparatus on the basis of the supply voltage profile data stored in the data memory of the control unit and wherein the control unit of the load protection and control apparatus is adapted to determine whether a load is connected to the output terminals on the basis of the profile data stored in the data memory of the control unit, wherein the control unit is adapted to switch off automatically the power switches if an unsymmetrical power supply of the load protection and control apparatus by the power supply network or an unsymmetrical power supply of the connected electrical load by the load protection and control apparatus is recognized by the control unit.

19. The load protection and control apparatus according to claim 1 comprising a user interface adapted to signal an operation state of said load protection and control apparatus and an operation state of the connected electrical load.

20. The load protection and control apparatus according to claim 1 wherein the driver circuit comprises the low voltage side connected to the control unit and the high voltage side connected to the power switch, wherein the low voltage side and the high voltage side of the driver circuit are galvanically separated from each other.

21. The load protection and control apparatus according to claim 1, wherein each input terminal comprises a protruding electrical contact configured to be inserted into matching contact slots of hybrid busbars of the busbar system or into slots of busbar adapter device.

22. The load protection and control apparatus according to claim 1 wherein the current rise speed sensor component comprises an inductivity of less than 1 milli Henry.

23. An automation system comprising at least one load protection and control apparatus and at least one electrical load connected to the output terminals of a load interface of said load protection and control apparatus, wherein the load protection and control apparatus comprises an overcurrent protection circuit having at least one input terminal wherein each input terminal is configured to establish an electrical connection with a busbar of the busbar system to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period, wherein the driver circuit comprises a low voltage side connected to the control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit.

24. The automation system according to claim 23 wherein the load protection and control apparatus further comprises a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

25. A method for controlling a power supply to a protected electrical load comprising the steps of:
receiving electrical power from a power supply network by at least one input terminal from a busbar of a busbar system;
generating a voltage drop at a current rise speed sensor component corresponding to a current rise speed of an electrical load current flowing from the input terminal via the current rise speed sensor component and a power switch to an output terminal to which the electrical load is connected;
switching the power switch automatically off by a driver circuit having a low voltage side connected to a control unit to receive control signals from the control unit and having a high voltage side which comprises logical gates provided to combine a signal applied to an input at the high voltage side logically with control signals received at the low voltage side of the driver circuit from the control unit, wherein the switching is performed within a switch-off period of less than one millisecond if the generated voltage drop (ALTO plus a voltage drop along the power switch applied as a sum voltage to the input at a high voltage side of the driver circuit exceeds a configurable threshold voltage to provide protection against an overcurrent,
wherein the switch-off operation is performed by the driver circuit without involving the control unit,
wherein the switch-off period of less than one millisecond is predefined by a hardware circuitry connecting the current rise speed sensor component to the input of the driver circuit and by internal propagation times of logical signals propagating via the logical gates of the high voltage side of the driver circuit; and
controlling an electrical power supplied to the connected electrical load by the control unit on the basis of a measured load current profile and a measured supply voltage profile, wherein a supply voltage at the input terminal is measured by a voltage sensor component and notified to the control unit to provide the supply voltage profile.

26. The method according to claim 25, further comprising:
determining an overload state of the connected electrical load by the control unit on the basis of the measured load current profile and
switching off the power switch by the driver circuit under control of the control unit or by an electromechanical relay if an overload state of the connected electrical load is determined by the control unit.

27. The method according to claim 26 wherein a type of the connected load is determined by the control unit on the basis of the measured load current profile and the measured supply voltage profile, wherein the type of the electrical load comprises a resistive, capacitive or inductive load, wherein the electrical power supplied to the electrical load is controlled by the control unit depending on the determined type of the connected electrical load.

28. A busbar system comprising busbars to which electrical loads are connected by means of load protection and control apparatuses, wherein the load protection and control apparatuses are provided for protecting and controlling the electrical loads connected to the load protection and control apparatuses, wherein the load protection and control apparatus comprises an overcurrent protection circuit having at least one input terminal wherein each input terminal is configured to establish an electrical connection with a busbar of the busbar system to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period, wherein the driver circuit comprises a low voltage side connected to a the control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit.

29. The busbar system according to claim 28 wherein the load protection and control apparatus is connected to massive busbars by means of busbar adapter devices having latches to engage massive busbars from behind.

30. The busbar system according to claim 28 wherein the load protection and control apparatus is connected to hybrid busbars by means of protruding electrical contacts configured to be inserted into matching slots of the hybrid busbars.

31. The busbar system according to claim 28 wherein the load protection and control apparatus further comprises a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

32. A system comprising DIN rail profiles comprising DIN rail adapters which support load protection and control apparatuses, wherein the load protection and control apparatus comprises an overcurrent protection circuit having at least one input terminal wherein each input terminal is configured to establish an electrical connection with a busbar to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period, wherein the driver circuit comprises a low voltage side connected to a the control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit.

33. The system according to claim 32 wherein the load protection and control apparatus further comprises a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

34. A fuse housing comprising an integrated load protection and control apparatus, wherein the load protection and control apparatus comprises an overcurrent protection circuit having at least one input terminal wherein each input terminal is configured to establish an electrical connection with a busbar to receive power from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load protection and control apparatus via the current rise speed sensor component and the power switch to the output terminal and having a driver circuit which is adapted to detect an occurring overcurrent depending on the voltage drop generated by the current rise speed sensor component and depending on a voltage drop along the power switch and which is adapted to switch off said power switch upon detection of an overcurrent within a predefined switch-off period, wherein the driver circuit comprises a low voltage side connected to a the control unit of the load protection and control apparatus to receive control signals from the control unit and a high voltage side which comprises logical gates provided to combine a signal applied to an input at the high voltage side logically with control signals received at low voltage side of the driver circuit from the control unit, wherein the driver circuit is adapted to switch off the power switch if the generated voltage drop plus the voltage drop along the power switch applied as a sum voltage to the input at the high voltage side of the driver circuit exceeds a configurable threshold voltage to provide protection against overcurrent, wherein the switch-off operation is performed by the driver circuit without involving the control unit of the load protection and control apparatus, wherein the switch-off period to switch off said power switch upon detection of an overcurrent is predefined by a hardware circuitry connecting the current rise speed sensor component to the input at the high voltage side of the driver circuit and by internal propagation times of logical signals propagating via the logical gates of the high voltage side of the driver circuit.

35. The fuse housing according to claim 34 wherein the load protection and control apparatus further comprises a power supply control circuit having a voltage sensor component adapted to measure at the input terminal a supply voltage notified to the control unit of the load protection and control apparatus to provide a supply voltage profile, wherein the control unit is adapted to control an electrical power supplied to the connected electrical load depending on the supply voltage profile and a measured load current profile.

* * * * *